(12) United States Patent
Nakano et al.

(10) Patent No.: US 8,254,753 B2
(45) Date of Patent: Aug. 28, 2012

(54) SUBTITLE GENERATING APPARATUS AND METHOD

(75) Inventors: Hiroshi Nakano, Kanagawa (JP);
Hiroyasu Furuse, Kanagawa (JP);
Yoshihisa Gonno, Kanagawa (JP);
Akifumi Mishima, Kanagawa (JP);
Tsutomu Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1643 days.

(21) Appl. No.: 11/412,692

(22) Filed: Apr. 27, 2006

(65) Prior Publication Data

US 2006/0245727 A1 Nov. 2, 2006

(30) Foreign Application Priority Data

Apr. 28, 2005 (JP) ................. P2005-132849

(51) Int. Cl.
*H04N 9/82* (2006.01)
(52) U.S. Cl. ......... 386/246; 386/239; 386/245; 386/248
(58) Field of Classification Search .................. 386/125, 386/126
See application file for complete search history.

(56) References Cited

U.S. PATENT DOCUMENTS

| | | | | |
|---|---|---|---|---|
| 7,190,880 B2* | 3/2007 | Cookson et al. | ................. | 386/95 |
| 7,295,762 B2* | 11/2007 | Sawabe et al. | .................. | 386/96 |
| 7,486,876 B2* | 2/2009 | Oh et al. | ........................ | 386/120 |
| 7,529,467 B2* | 5/2009 | Jung et al. | ....................... | 386/95 |

FOREIGN PATENT DOCUMENTS

| | | |
|---|---|---|
| JP | 2004-336606 | 11/2004 |
| JP | 2006-308952 | 11/2006 |

* cited by examiner

*Primary Examiner* — Jamie Atala
(74) *Attorney, Agent, or Firm* — Frommer Lawrence & Haug LLP; William S. Frommer; Thomas F. Presson

(57) ABSTRACT

For generation of a subtitle in a digital movie screening system, it is essential to reduce the burden of processing the subtitle when screening a movie. There is provided a subtitle generating apparatus destined for use in a digital movie screening system, the subtitle generating apparatus, which includes a storage unit having a movie subtitle file stored therein, a controller to generate an internal file on the basis of the subtitle file, and a subtitle processor to decode the internal file for generating a subtitle and combine the subtitle and a movie picture with each other, the subtitle file consisting of a main file in which there are described information identifying a file of text data representing characters to be displayed as a subtitle of a movie and a file of image data representing the content of an image displayed as the movie subtitle along with control data for displaying the subtitle, one or more font files including font data on the text data, and one or more image files including the image data, the internal file being an integration of the main, font and image files, made by combining the described content of the main file with the substantive data of the font and image files, and the controller generating the internal file from the subtitle file prior to displaying the movie.

20 Claims, 18 Drawing Sheets

SUBTITLE GENERATING APPARATUS AND METHOD

CROSS REFERENCES TO RELATED APPLICATIONS

The present invention contains subject matter related to Japanese Patent Application JP 2005-132849 filed in the Japanese Patent Office on Apr. 28, 2005, the entire content of which is incorporated herein by reference.

BACKGROUND OF THE INVENTION

1. Field of the Invention

The present invention relates to a subtitle generating apparatus and method destined for use in a digital movie screening system.

2. Description of the Related Art

Recently, there has been widely prevalent a digital movie screening system in which a movie is projected on a large screen through the use of digital data, not any film, as a picture source. The Digital Cinema Initiatives, LLC (DCI) of the industry group of major motion picture companies in USA proposed a digital movie standard (Web site of the LCC (DCI): URL: http//www.dcimovies.com/ was on-line accessed on Apr. 28, 2005).

According to the DCI-proposed digital movie standard, a still picture in a format of 2000 (1920 H×1080 V) by 4000 (4096 H×2160 V) pixels is to be encoded at a rate of 24 pictures/sec with the technique specified in the JPEG 2000.

Also, the DCI proposed a specification under which a subtitle to be combined with a picture is formed into a file separately from the picture data for distribution to users (movie theater) so that the user can combine the picture and subtitle with each other at the time of screening.

The specification is under detailed standardization by the subcommittee "Digital Cinema Technology" (DC 28) of the Technology Committees of the SMPTE (Society of Motion Picture and Television Engineers) (Web site: http://www.smpte.org/engineering_committees/technology commit-tees/).

FIG. 1 shows an example of the subtitle file generation/screening in the digital movie screening system.

As shown in FIG. 1, the digital movie screening system, generally indicated with a reference numeral 1, includes a content creator-side system 2 to create a content and form it into data in a predetermined format, and a user-side system 3 equipped in a movie theater where a picture is to be projected on a screen.

The above content creator-side system 2 generates text data representing information to be displayed as a subtitle on a picture, substantive data on a font for each of characters to be displayed as the subtitle and image data to be displayed as the subtitle when displaying characters, graphics, etc. which are not represented by the text data, and supplies these data to a subtitle file generator 2-1. The subtitle file generator 2-1 transforms the text data, substantive font data and image data into a subtitle file 10 in a predetermined format specified by the SMPTE. The subtitle file 10 thus generated in the content creator-side system 2 is packaged into, for example, a recording medium, and distributed to the user-side system 3. Alternatively, the subtitle file 10 may be transferred from the content creator-side system 2 to the user-side system 3 via a network or the like.

The user-side system 3 receives the subtitle file 10 from the content creator-side system 2 via a recording medium or network, and stores it into a content storage unit 200. A content decoder 100 reads, decodes the subtitle file 10 stored in the content storage unit 200 (XML file 11, font file 12 and PNG file 13), depicts a subtitle and combines the depicted subtitle with a picture in a movie. The movie picture data to be combined with the subtitle is supplied to a picture output unit 300 such as projector and projected onto a screen.

The subtitle file 10 includes the XML file 11 as a main file, font file 12 and PNG file 13 as above.

The XML file 11 is described in XML (extensible markup language; one of the document markup languages). The XML file 11 has described therein text data representing letters and symbols to be displayed as a subtitle is described per element (per scene, for example) and also control data representing a display time, display position, font type, etc. per element when displaying the text data. Also, for displaying PNG data as a subtitle, the XML file 11 has described therein a file name of the PNG data (location on the network, such as URL, in case the file is acquired via the network) and also control data representing the display time, display position, etc. per element for displaying the PNG data.

The font file 12 has stored therein the substance of a font for displaying text data as an image on the screen, for example, substantive data on a font, such as Gothic font. Many movies use special movie-dedicated fonts, not such ones as used in ordinary books and computers. The content creator will acquire a license for use of such fonts from a font creator and describe the fonts in the subtitle file.

The PNG file 13 has stored therein image data on special fonts, symbols, graphics, etc. not included in the font file 12 but prepared in the PNG form for displaying on the screen. Since the PNG file 13 is formed for each scene in one movie in which the subtitle image is displayed, thousands files are formed per movie as the case may be.

FIG. 2 shows an example of directory/file structure of the subtitle file 10 stored in the content storage unit 200.

In FIG. 2, "STP" stands for the subtitle file 10. In the STP, there are formed an xml folder, font folder and PNG folder.

The xml folder has the XML file 11 (subtitle.xml) stored therein. The font folder has stored therein one or more font files 12 (MovieFont1.ttf, MovieFont2.ttf, MovieFont3.ttf) referred to in the XML file 11. There exist as many font files 12 as the types of fonts used in subtitles displayed in one movie. The PNG folder has stored therein one or more PNG files 13 (PNG001.PNG,PNG002.PNG, PNG003.PNG, . . . , PNGxxx.PNG) referred to in the XML file 11.

Next, an example of a description made in the XML file 11 as specified by the SMPTE will be shown.

---

<Subtitle SpotNumber="3"
   TimeIn="00:00:13:000" TimeOut="00:00:16:000"
   FadeUpTime="00:00:00:020" FadeDownTime="00:00:00:020">
   <Font ID="MovieSubtitleFont3" Script="normal" Effect="border"
    Italic="no" Underline="no" Weight="normal"
    Color="FFFFFFFF" EffectColor="FF000000" Size="42">
    <Text Halign="center" Hposition="0"
     Valign="bottom" Vposition="10" Direction="ltr">
(Characters in the movie subtitle font 3)
    </Text>
    <Text Halign="center" Hposition="0"
     Valign="bottom" Vposition="4" Direction="ltr">
(Characters in the second line)
    </Text>
   </Font>
</Subtitle>

---

Each of items in the format in which the above XML file 11 is described has the following meaning.

Various descriptions of subtitle data are made in a field defined between <Subtitle> and </Subtitle>. SpotNumber="xxx" indicates a scene number (element number) of the subtitle.

TimeIn="HH:MM:SS:EEE" is a time at which characters or pictures start being displayed. TimeOut="HH:MM:SS:EEE" is a time at which display of characters or pictures is ended. FadeUpTime="HH:MM:SS:EEE" is a time taken for shift from 100% transparency to complete opacity. FadeDownTime="HH:MM:SS:EEE" is a time taken for shift from complete opacity to 100% transparency.

Font information is described in the area between <Font> and </Font>.

ID="xxxxxxx" is a name of the font file. Script="xxxxx" specifies whether a font is to be formed as superscript, subscript or normally along the base line. Effect="xxxxx" specifies whether a font is to be outlined, shadowed or formed normally. Italic="xx" specifies whether a font is to be italicized. Underline="xxxxx" specifies whether a font is to be underlined. Weight="xxxxx" specifies whether a font is to be formed in bold type. Color="xxxxx" specifies a color in which a font is to be formed. EffectColor="xxxxx" specifies a color in which a font is to be outlined or shadowed in case outlining or shadowing has been selected with Effect. Size="xxxxx" specifies a size in which a font is to be formed.

Text information is described in a field defined between <Text> and </Text>.

Halign="xxxxx" specifies a horizontal position of a character or picture in reference to Hposition. Hposition="xxxxx" specifies a reference for the horizontal position of a character or picture. For example, when Halign=Left, the left end of a screen is specified as the reference. When Halign=Right, the screen right end is specified as the reference. When Halign=Center, the screen center is specified as the reference. Valign="xxxxx" specifies a vertical position of a character or picture in reference to Vposition. Vposition="xxxxx" specifies a reference for the vertical position of a font or picture. For example, when Valign=Top, the upper end of a screen is specified as the reference. When Valign=Bottom, the screen lower end is specified as the reference. When Valign=Center, the screen center is specified as the reference. Direction="xxxxx" specifies a direction in which characters are to be depicted. Further, the content of a text described in a place short of </Text> is the content of characters displayed as a subtitle.

In case the subtitle file 10 including the above-mentioned XML file 11 is processed by a subtitle processor in the content decoder 100 for depiction of a subtitle, the subtitle processor has to make the following operations.

First, the subtitle processor extracts information Time/In, TimeOut, FadeUpTime and FadeDownTime from a field defined between <Subtitle . . . and </Subtitle>.

Next, the subtitle processor extracts information Italic, Underline, Weight, Color and EffectColor from a field defined between <Font . . . and </Font>.

Then, the subtitle processor determines that two lines of character strings exist in the field defined between <Text . . . and </Text>, extracts information Halign, Hposition, Valign and Vposition, and then determines that character information in the first one of the above two lines is "Characters in the movie subtitle font 3" and that in the second line is "Characters in the second line".

Next, another example of description made in the XML file 11 as specified by the SMPTE.

```
<Subtitle SpotNumber="1"
   TimeIn="00:00:05:000" TimeOut="00:00:15:000"
   FadeUpTime="00:00:00:020" FadeDownTime="00:00:00:020">
   <Image Halign="center" Hposition="0"
     Valign="bottom" Vposition="10">
     .¥STP¥PNG¥PNG001.png
   </Image>
</Subtitle>
```

Each of items in the format in which the above XML file 11 is described has the following meaning.

Note that portions of the format identical in content to those having been explained concerning the above XML file 11 will not be explained.

Information on image data of a PNG file when the image data is displayed as a subtitle is described in a field defined between <Image . . . and </Image>.

Halign="xxxxx" specifies a horizontal position of the image in reference to Hposition. Hposition="xxxxx" specifies a reference for the horizontal position of the image. Valign="xxxxx" specifies a vertical position of the image in reference to Vposition. Vposition="xxxxx" specifies a reference for the vertical position of the image.

Further, the substance of the PNG file 13 to be displayed as a subtitle exists in a file storage location or at a network address in a place short of </Image>.

In case the subtitle file 10 including the above-mentioned XML file 11 is processed for depiction of a subtitle by the subtitle processor in the content decoder 100, the subtitle processor has to make the following processing operations.

First, the subtitle processor extracts information TimeIn, TimeOut, FadeUpTime and FadeDownTime from a field defined between <Subtitle . . . and </Subtitle>.

Then, the subtitle processor extracts the information Halign, Hposition, Valign and Vposition from a field defined between <Image> and </Image>, accesses the content storage unit 200 and network to read the PNG file 13 from the file storage location, and decodes the PNG file 13.

The user-side system 3 in the digital movie screening system 1 processes a subtitle as above.

SUMMARY OF THE INVENTION

On the assumption that one scene includes 20 characters (40 bytes) and one piece of movie includes 3000 scenes, the text data part of a subtitle will be 120 kilobytes in capacity. Also, with an overhead such as control data after conversion into XML being taken in account, the XML file 11 including text data and other control data will be several megabytes in capacity.

Also considering that one file is of about several 10 megabytes and one piece of movie needs 5 types of fonts, the font file 12 will be 100 megabytes in capacity per movie.

On the assumption that one file includes 100 kilobytes and one piece of movie includes 3000 scenes, the PNG file 13 will be 300 megabytes in capacity per movie. Also, on the assumption that one file includes 300 kilobytes, the PNG file 13 will be 900 megabytes in capacity per movie.

The total capacity of the XML file 11 and font file 12 is about 100 megabytes, which is relatively small. This capacity is sufficient for pre-transferring the XML file 11 and font file 12 from the content storage unit 200 to a working memory in the subtitle processor in the content decoder 100 for having the subtitle processor process the files.

On the other, the total capacity of the PNG file 13 is 300 megabytes or more. Since the entire PNG file 13 cannot be pre-transferred to the working memory in the subtitle processor prior to screening a movie, so it is necessary to access the content storage unit 200 for transfer of the PNG file 13 appropriately when necessary while processing the PNG file 13 for screening.

However, if the file transfer is made frequently, the file access and control of each processing circuit will conflict with each other, possibly causing a delay of file transfer, file missing or delayed control and thus lowering the reliability of the system control.

Further, no doubt the XML file 11 and font file 12 can also be transferred to the working memory in the subtitle processor, but interpretation of subtitle data to extract information is a burden to the subtitle processor implemented by a processor capable of integrating operations.

It is therefore desirable to overcome the above-mentioned drawbacks of the related art by providing a subtitle generating apparatus and method, capable of generating a subtitle in a digital movie screening system with a reduced burden of subtitle processing for screening a movie.

According to the present invention, there is provided a subtitle generating apparatus destined for use in a digital movie screening system, the subtitle generating apparatus including:
a storage unit having a movie subtitle file stored therein;
a controller to generate an internal file on the basis of the subtitle file; and
a subtitle processor to decode the internal file for generating a subtitle and combine the subtitle and a movie picture with each other,
the subtitle file consisting of a main file in which there are described information identifying a file of text data representing characters to be displayed as a subtitle of a movie and a file of image data representing the content of an image displayed as the movie subtitle along with control data for displaying the subtitle, one or more font files including font data on the text data, and one or more image files including the image data;
the internal file being an integration of the main, font and image files, made by combining the described content of the main file with the substantive data of the font and image files; and
the controller generating the internal file from the subtitle file prior to displaying the movie.

According to the present invention, there is also provided a subtitle generating apparatus destined for use in a digital movie screening system, the subtitle generating apparatus including:
a storage unit having a movie subtitle file stored therein;
a controller to generate an internal file on the basis of the subtitle file; and
a subtitle processor to decode the internal file for generating a subtitle and combine the subtitle and a movie picture with each other,
the subtitle file consisting of a main file in which there are described information identifying a file of text data representing characters to be displayed as a subtitle of a movie and a file of image data representing the content of an image displayed as the movie subtitle along with control data for displaying the subtitle, one or more font files including font data on the text data, and one or more image files including the image data;
the internal file including an index part in which there are described data size per element of a picture data part and time at which each element is to be displayed;
the controller generating the internal file from the subtitle file prior to displaying the movie.

According to the present invention, there are also provided a method of generating a subtitle in a digital movie screening system, wherein:
there having been stored in a recording medium a subtitle file consisting of a main file in which information identifying a file of text data representing characters to be displayed as a subtitle of a movie and a file of image data representing the content of an image to be displayed as the movie subtitle is described along with control data for displaying a subtitle, one or more font files including font data on the text data, and one or more picture files including the image data, and
there having been generated an internal file that is an integration of the main, font and image files prior to screening the movie by combining the described content of the main file with the substantive data of the font and image files on the basis of the subtitle file,
the subtitle is generated by decoding the internal file while a movie picture is screened; and combined with the movie picture.

According to the present invention, there are also provided a method of generating a subtitle in a digital movie screening system, wherein:
there having been stored in a recording medium a subtitle file consisting of a main file in which information identifying a file of text data representing characters to be displayed as a subtitle of a movie and a file of image data representing the content of an image to be displayed as the movie subtitle is described along with control data for displaying a subtitle, one or more font files including font data on the text data, and one or more picture files including the image data,
an internal file including an index part in which there are described data size per element of a picture data part and time at which each element is to be displayed is generated from the subtitle file prior to screening the movie.

In the subtitle generating apparatus and method according to the present invention, a subtitle file consisting of a main file, font file and image file is generated as an internal file that is an integration of the files prior to screening an movie.

Thus, the subtitle generating apparatus and method are capable of generating a subtitle in a digital movie screening system with a reduced burden of subtitle processing in screening a movie.

DETAILED DESCRIPTION OF THE PREFERRED EMBODIMENTS

A digital movie screening system will be described in detail below as an embodiment of the present invention with reference to the accompanying drawings. It should be noted that the digital movie screening system that will be described below is a DCI-proposed system capable of screening a digital movie.

Overall Description

Figure 3:
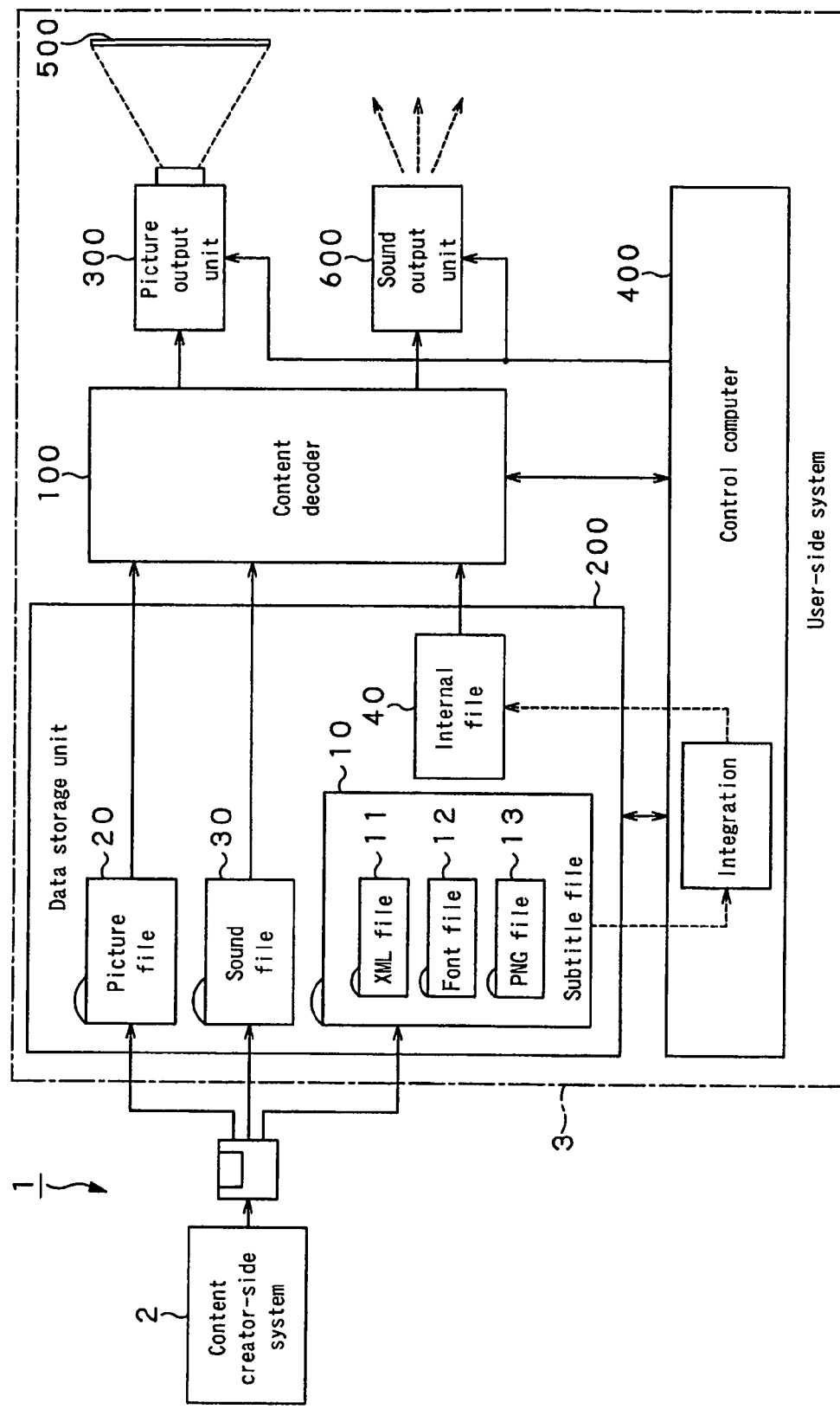
FIG. 3 is a block diagram of a digital movie screening system according to the present invention.
Figure 4:
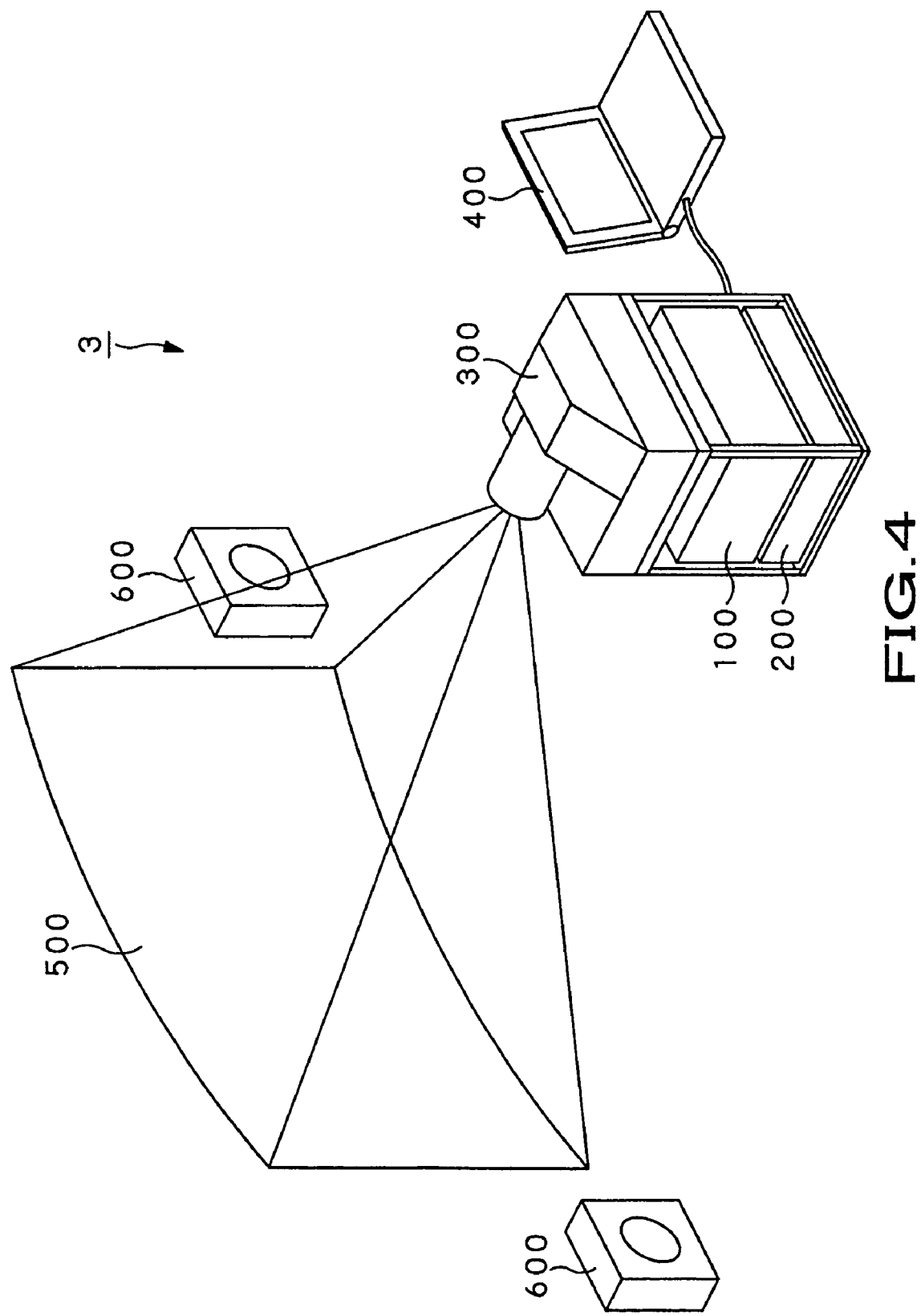
FIG. 4 schematically illustrates a system at the user (movie theater) side in the digital movie screening system according to the present invention.

FIG. 3 is a block diagram of the digital movie screening system, and FIG. 4 schematically illustrates a system at the user (movie theater) side in the digital movie screening system according to the present invention. The system at the user will be referred to as "user-side system" hereunder.

As shown in FIG. 3, the digital movie screening system, generally indicated with a reference numeral 1, includes a content creator-side system 2 to create a content and form it into data having a predetermined format, and a user-side system 3 equipped in a movie theater in which a picture is projected onto a screen.

As shown in FIGS. 3 and 4, the user-side system 3 includes a content decoder 100 to decode picture, sound and subtitle from a picture file, sound file and subtitle file as movie sources of a picture, sound and subtitle, respectively, a content storage unit 200 consisting of a group of, for example, hard discs, to store the picture, sound and subtitle files as the movie sources of a picture, sound and subtitle, respectively, a picture output unit 300 to project a picture decoded by the content decoder 100, a control computer 400 to make control over the content decoder 100 from outside and operate otherwise, a screen 500 on which a picture is projected from the picture output unit 300, and a sound output unit 600 to output a sound decoded by the content decoder 100.

Note that in order to keep the security of the picture, sound and subtitle files as the movie sources, the content decoder 100 and content storage unit 200 in the user-side system 3 are designed to give such security that no physical and electronic reference can be made to source data.

The content creator-side system 2 creates a picture file 20, sound file 36 and subtitle file 10 each based on the SMPTE standard, and passes them to the user-side system 3 via a recording medium or network. The picture file 20, sound file 30 and subtitle file 10 are sources for movie screening and take the place of the conventional film. The picture file 20 contains data for displaying a picture, the sound file 30 contains data for outputting a sound, and the subtitle file 10 contains data for depicting a subtitle being superposed on a picture.

Figure 1:
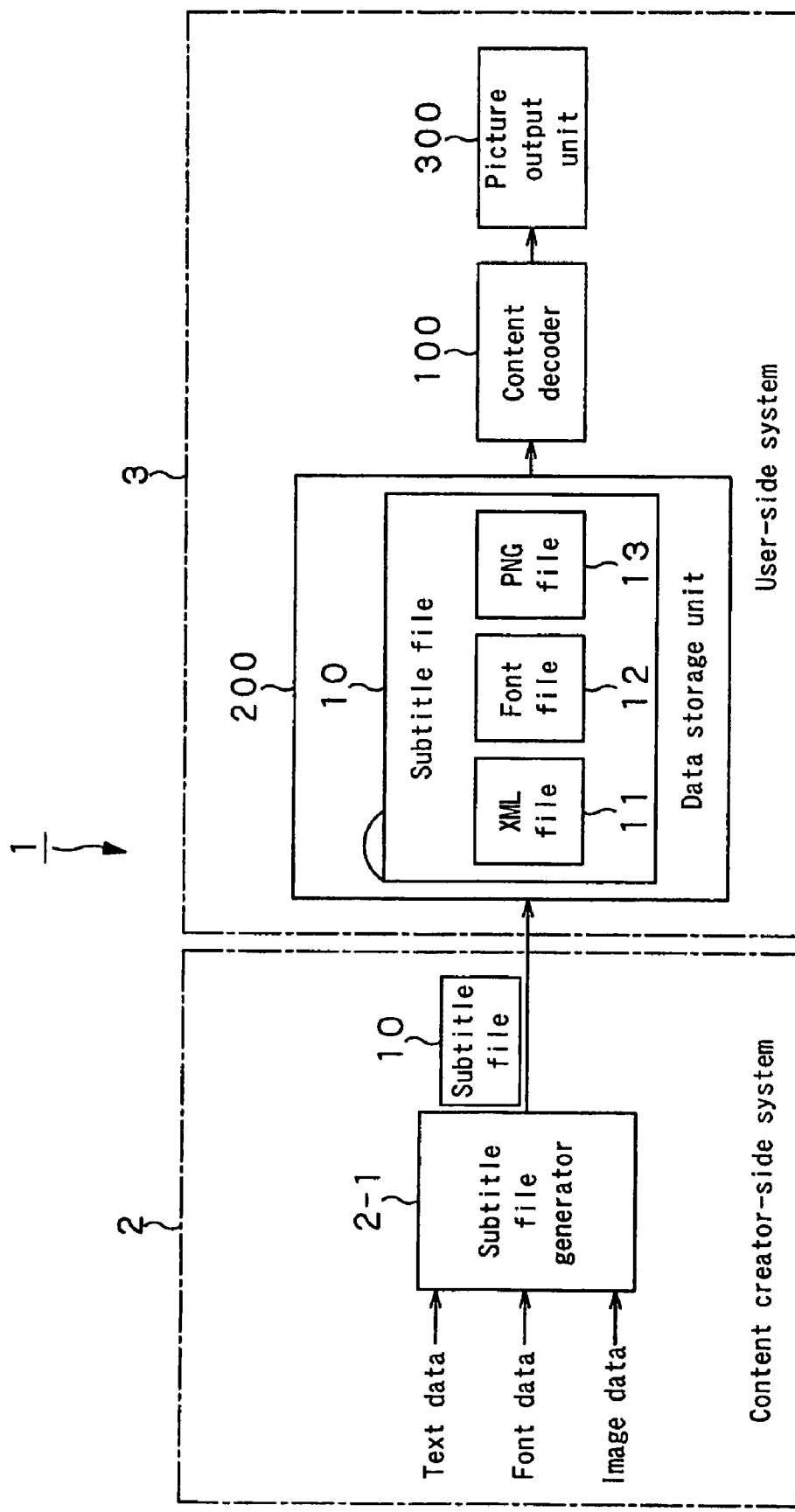
FIG. 1 shows a block of subtitle file creation/screening in the digital movie screening system.
Figure 2:
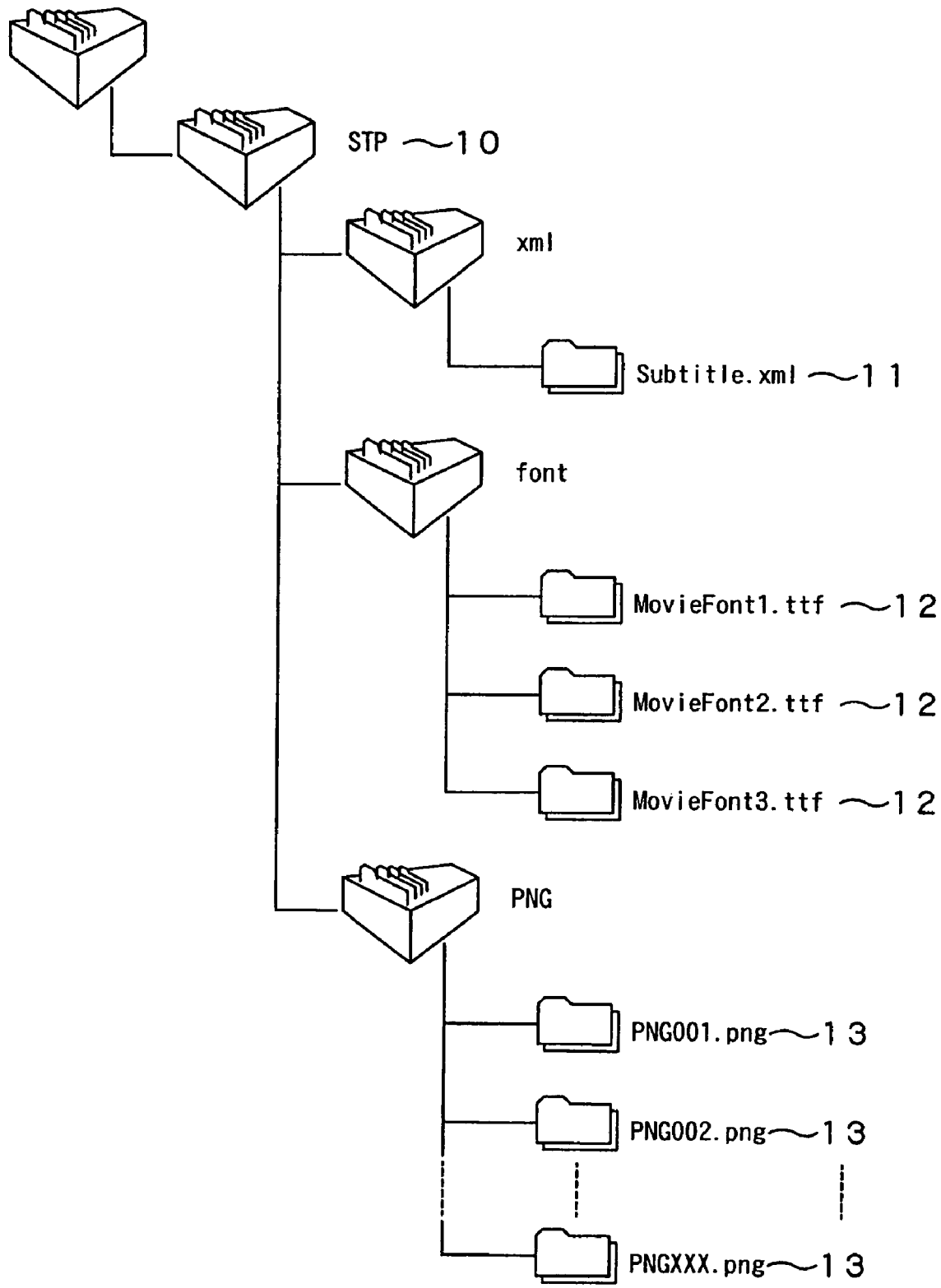
FIG. 2 shows a directory/file structure of a subtitle file stored in a content storage unit.

The subtitle file 10 is similar to that having previously been explained in the "Description of the Related Art" with reference to FIG. 2. That is, the subtitle file 10 consists of the XML file 11, font file 12 and PNG file 13.

The user-side system 3 receives the picture file 20, sound file 30 and subtitle file 10 from the content creator-side system 2, and stores them into the content storage unit 200.

When a movie screening is started, the picture file 20, sound file 30 and subtitle file 10 stored in the content storage unit 200 are read and decoded by the content decoder 100. The content decoder 100 decodes the picture file 20 to generate picture data having a subtitle combined therewith, and supplies the picture data to the picture output unit 300. The picture output unit 300 projects the supplied picture data onto the screen 500. Also, the content decoder 100 decodes the sound file 30 to generate sound data, and supplies the sound data to the sound output unit 600. The sound output unit 600 outputs the supplied sound data from a speaker.

In the content creator-side system 2, the subtitle file 10 (XML file 11, font file 12 and PNG file 13) are pre-integrated, prior to screening a movie, to form one internal file 40 described in a predetermined format (will be referred to as "internal format" hereunder). At screening the movie, the content decoder 100 reads the internal file 40, not the subtitle file 10, for decoding and depicting a subtitle. Also, the internal file 40 is generated by the control computer 400 from the subtitle file 10.

Note that the internal file 40 and generation of the internal file 40 from the subtitle file 10 will be described in detail later.

Content Decoder

The content decoder 100 is constructed as will be described below with reference to FIG. 5.

Figure 5:
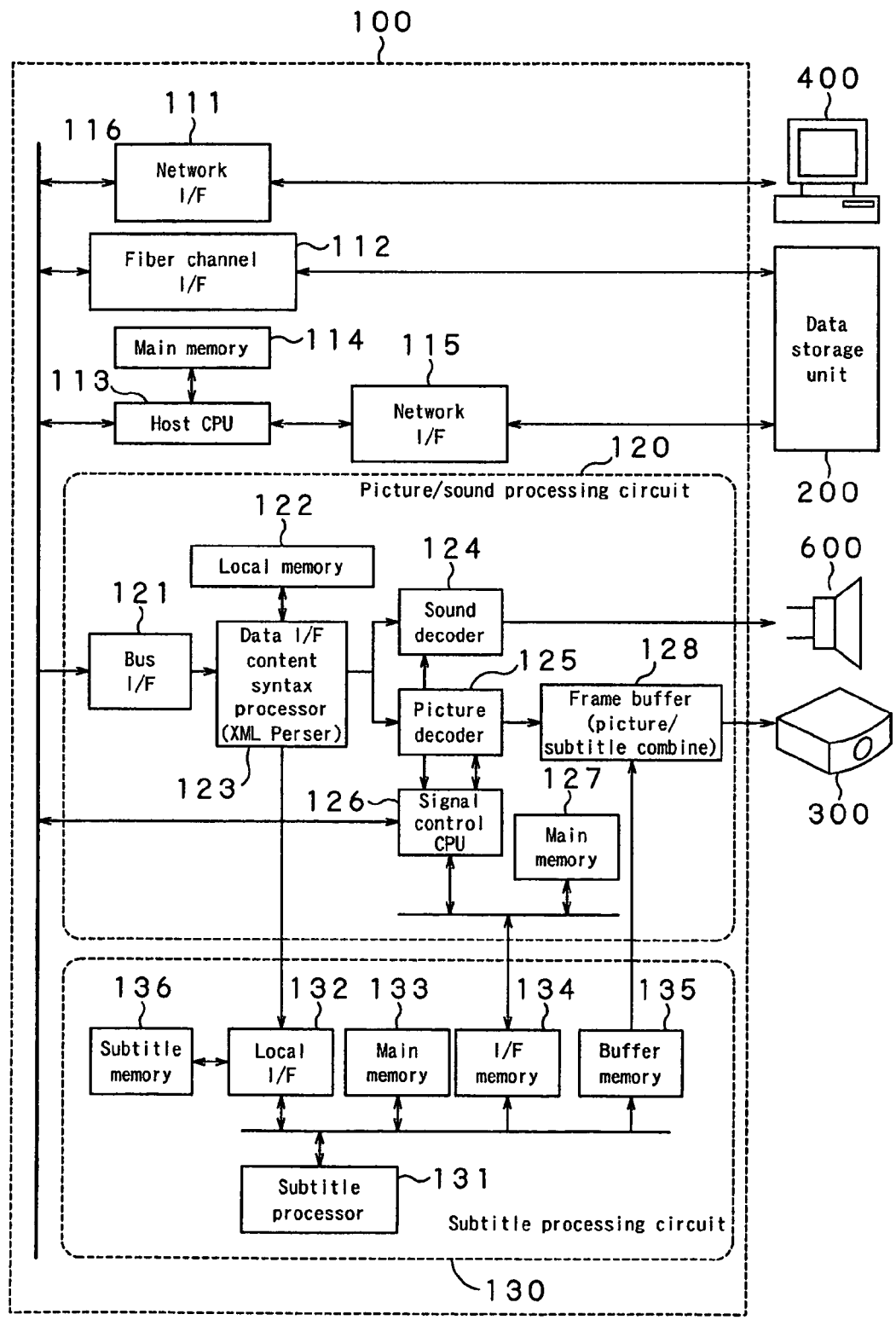
FIG. 5 is a block diagram of a content decoder.

As shown in FIG. 5, the content decoder 100 includes a first network interface 111 to communicate with the control computer 400, fiber channel interface 112 to make rapid communication with the content storage unit 200, host CPU (central processing unit) 113, main memory 114 as a working memory of the host CPU 113, and a second network interface 115 by which the host CPU 113 communicates with the content storage unit 200.

The content decoder 100 further includes a picture/sound processing circuit 120 to analyze control data etc. and decode pictures and sound, and a subtitle processing circuit 130.

The content decoder 100 has also a bus 116 having connected thereto the first network interface 111, fiber channel interface 112, host CPU 113 and picture/sound processing circuit 120. Communications are made among them under the control of the host CPU 113.

The picture/sound processing circuit 120 includes a bus interface 121 to communicate with the bus 116, a content syntax processor 123 to interpret content syntax of data, judge which the data is, picture, sound or subtitle and distribute them appropriate, a local memory 122 as a working memory of the content syntax processor 123, a sound decoder 124, a picture decoder 125, a signal processing CPU 126 to make various kinds of control for picture decoding, a main memory 127 as a working memory of the signal processing CPU 126, and a frame buffer (picture/subtitle synthesizer) 128 to provisionally store a picture decoded by the picture decoder 125 and combine the stored picture with a subtitle image processed by the subtitle processing circuit 130.

The subtitle processing circuit 130 includes a subtitle processor 131 to decode and depict a subtitle, a local interface 132 for reception of subtitle-related data from the content syntax processor 123, a main memory 133 as a working memory of the subtitle processor 131, an interface memory 134 for communication between the signal processing CPU 126 of the picture/sound processing circuit 120 and the subtitle processor 131, a buffer memory 135 to depict a decoded subtitle as an image, and a subtitle memory 136 to store data on yet-to-decoded, received from the content storage unit 200.

The content decoder 100 constructed as above operates as will be described below:

The picture file 20, sound file 30 and internal file 40, created by the content creator, are stored in the content storage unit 200. The host CPU 113 accesses each of the files stored in the content storage unit 200 to acquire each file via the fiber channel interface 112 or second network interface 115. The host CPU 113 transfers each file thus acquired to the picture/sound processing circuit 120 via the bus 116.

Each file transferred to the picture/sound processing circuit 120 is passed over to the content syntax processor 123 via the bus interface 121. The content syntax processor 123 makes syntax processing of the supplied file to decompose it into a picture file 20, sound file 30 and internal file 40. It passes the picture file 20 to the picture decoder 125, sound file 30 to the sound decoder 124, and the internal file 40 to the subtitle memory 136 via the local interface 132 of the subtitle processing circuit 130.

The subtitle processor 136 transfers a text data part and font part of the internal file 40 once stored in the subtitle memory 136 to the main memory 133 and informs the host CPU 113, via the interface memory 134, signal control CPU 126 and bus 116, of the readiness for screening.

The host CPU 113 receives the information of the readiness of the sound decoder 124, picture decoder 125 for screening along with the above information supplied via the signal control CPU 126 and bus 116 to determine that the digital movie screening system 1 has been ready for screening. After this determination, the host CPU 113 sends a screening start control signal to the sound decoder 124 and picture decoder 125 via the bus 116 and signal control CPU 126, and at the same time to the subtitle processor 131 via the bus 116, signal control CPU 126 and interface memory 134.

After receiving the display start control signal from the host CPU 113, the subtitle processor 131 transfers a PNG data part stored in the subtitle memory 136 to the main memory 133, proceeds with decoding of the PNG data part and writes decoded still picture data into the buffer memory 135. Also the subtitle processor 113 proceeds with processing of the already stored text data part and font part for depiction and writes the result of processing into the buffer memory 135. The still picture data and character data thus described are sent to the frame buffer 128 in which they will be combined with output moving picture data in the picture decoder 125. The image thus synthesized is supplied to the picture output unit 300. Similarly, sound data from the sound decoder 124 is supplied to the sound output unit 600.

Generating the Internal File from the Subtitle File

The subtitle file 10 is converted into the internal file 40 as will be described below:

In the user-side system 3, the subtitle file 10 created by the content creator is converted into the internal file 40 prior to screening a movie for a reduced burden of subtitle processing at the time of screening.

The internal file 40 is a synthetic file that is an integration of the XML file 11, one or more font files 12 and one or more PNG files 13 in the subtitle file 10.

More specifically, the internal file 40 reflects an extracted description of each control information in the XML file 11 in the subtitle file 10 as it is. Also, if the name (or URL) of the font file 12 is described in the XML file 11, the substantive data in the font file 12 is pre-read and taken in the internal file 40. Also, if the name (or URL) of the PNG file 13 is described in the XML file 11, the substantive data is pre-read and taken in the internal file 40.

Also, the internal file 40 consists of an index part, header part, text data part and a picture data part arranged in this order from the top thereof toward the bottom.

The header part contains information for identification of the entire content of the subtitle file 10 described in the top portion of the subtitle file 10, and substantive data in the font file 20.

The text data part contains a description in a portion, where text data is described (defined between <Text> and </Text>), of a portion, where subtitle information is described (defined between <Subtitle> and </Subtitle>), of the subtitle file 10, and a description in a portion, where font information is described (defined between <Font> and </Font>), of the subtitle file 10.

The picture data part contains PNG file display time, positional information and substantive data on the PNG file 10 in a portion, where picture data is described (defined between <Image> and </Image>), of a portion, where subtitle information is described (defined between <Subtitle> and </Subtitle>), of the subtitle file 10.

The index part has described therein the size of each of the header, text data and picture data parts, and the size and display time of each element (scene) in the picture data part.

Algorithms for generating the parts of the internal file 40 will be explained below with reference to the flow diagrams in FIGS. 6 to 11.

Generating the Header Part of the Internal File

Figure 6:
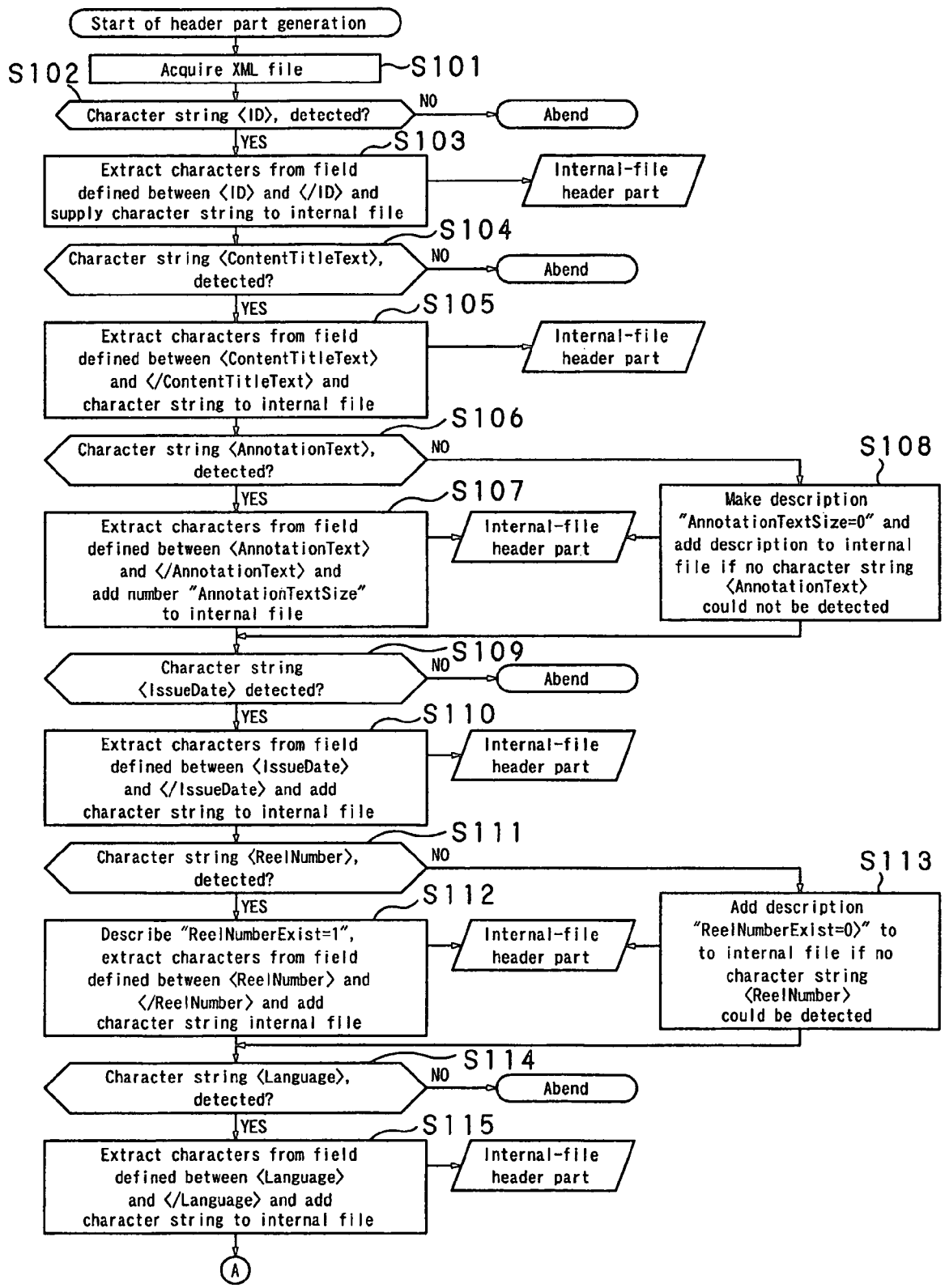
FIG. 6 shows a flow of operations made in generating a header part of an internal file.
Figure 7:
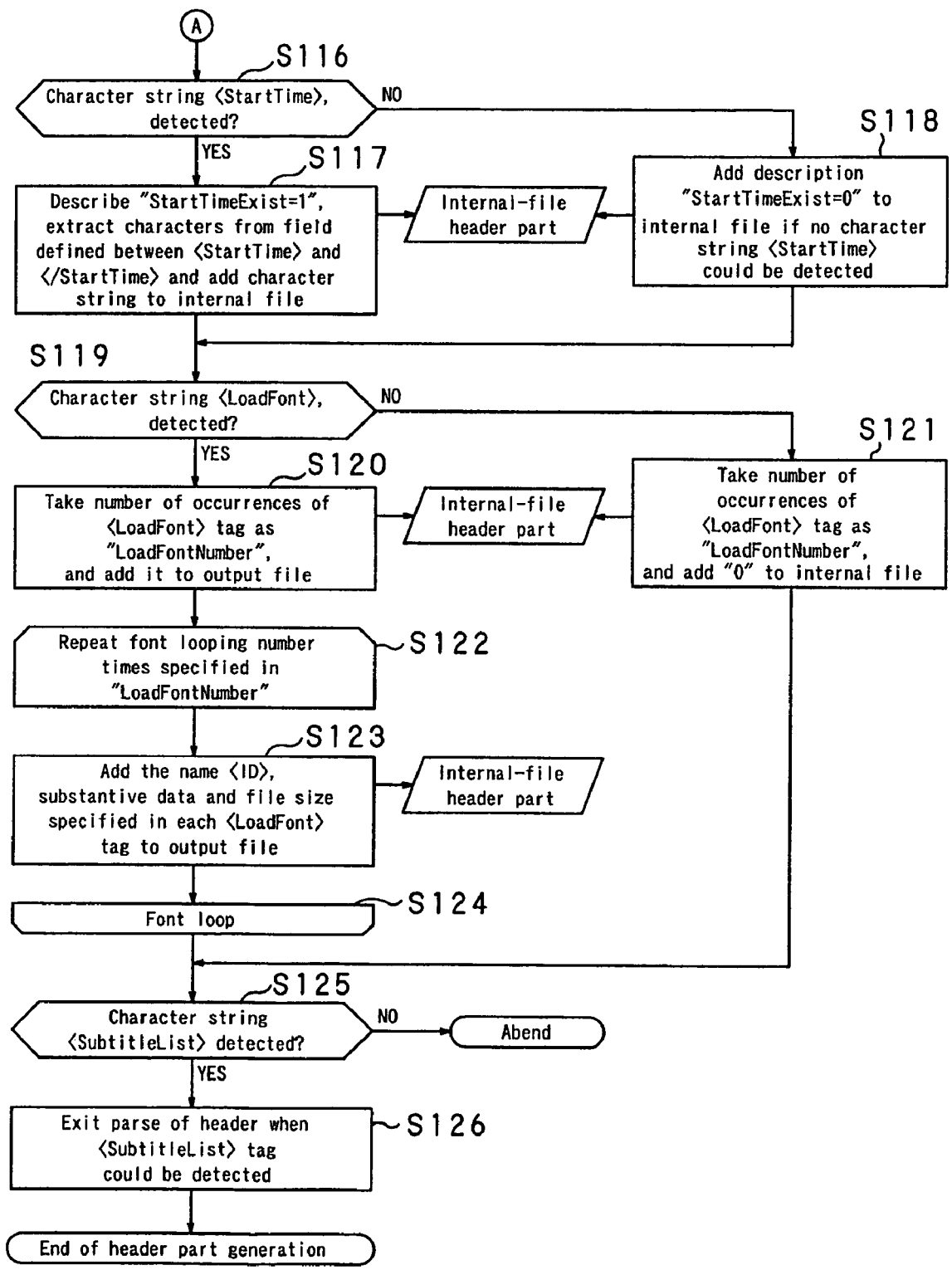
FIG. 7 shows a flow diagram continued from that in FIG. 6.

FIGS. 6 and 7 show flows of operations made in generating the header part of the internal file 40 by the control computer 400.

First in step S101, the control computer 400 acquires the XML file 11 in the subtitle file 10 by reading it from the content storage unit 200.

Then in step S102, the control computer 400 detects a character string <ID> in the input XML file 11 in the subtitle file 10. Detection of no character string <ID> will cause the control computer 400 to abend (abnormally exit the procedure). In case it could detect a character string <ID>, it goes to step S103 in which it will extract characters from the field defined between <ID> and </ID> in the input XML file 11 in the subtitle file 10 and add the character string to the header part of the internal file 40.

Then in step S104, the control computer 400 detects a character string <ContentTitle Text> in the input XML file 11 in the subtitle file 10. Detection of no character string <ContentTitleText> will cause the control computer 400 to abend. In case it could detect a <ContentTitleText>, it goes to step S105 in which it will extract characters from the field defined between <ContentTitleText> and </ContentTitleText> in the input XML file 11 in the subtitle file 10 and add the character string to a continuation of the header part of the internal file 40.

Next in step S106, the control computer 400 detects a character string <Annotation Text> in the input XML file 11 in the subtitle file 10. In case the control computer 400 could detect a character string <AnnotationText>, it goes to step S107 in which it will extract characters from a field defined between <AnnotationText> and </AnnotationText> in the input XML file 11 in the subtitle file 10, convert the size corresponding to the extracted characters into a number of pixels to describe it as a variable "AnnotationTextSize" and then add the character string to the continuation of the header part of the internal file 40. On the contrary, if the control computer 400 could not detect any character string <AnnotationText>, it goes to step S108 in which it will add a description "AnnotationTextSize=0" to the continuation of the header part of the internal file 40.

Then in step S109, the control computer 400 detects a character string <IssueDate> in the input XML file 11 in the subtitle file 10. Detection of no character string <IssueDate> will cause the control computer 400 to abend. In case it could detect a character string <IssueDate>, it goes to step S110 in which it will extract characters from the field defined between <IssueDate> and </IssueDate> in the input XML file 11 in the subtitle file 10 and add the character string to the header part of the internal file 40.

Next in step S111, the control computer 400 detects a character string <ReelNumber> in the input XML file 11 in the subtitle file 10. In case the control computer 400 could detect a character string <ReelNumberExist>, it goes to step S112 in which it will describe "ReelNumber=1" and then extract characters from a field defined between <ReelNumber> and </ReelNumber> in the input XML file 11 in the subtitle file 10 and add the character string to the continuation of the header part of the internal file 40. On the contrary, if the control computer 400 could not detect any character string <ReelNumber>, it goes to step S113 in which it will add a description "ReelNumberExist=0>" to the continuation of the header part of the internal file 40.

Then in step S114, the control computer 400 detects a character string <Language> in the input XML file 11 in the subtitle file 10. Detection of no character string <Language> will cause the control computer 400 to abend. In case it could detect a character string <Language>, it goes to step S115 in which it will extract characters from the field defined between <Language> and </Language> in the input XML file 11 in the subtitle file 10 and add the character string to the header part of the internal file 40.

Next in step S116, the control computer 400 detects a character string <StartTime> in the input XML file 11 in the subtitle file 10. In case the control computer 400 could detect a character string <StartTime>, it goes to step S117 in which it will describe "StartTimeExist=1" and then extract characters from a field defined between <StartTime> and </StartTime> in the input XML file 11 in the subtitle file 10 and add the character string to the continuation of the header part of the internal file 40. On the contrary, if the control computer 400 could not detect any character string <StartTime>, it goes to step S118 in which it will add a description "StartTimeExist=0>" to the continuation of the header part of the internal file 40.

Next in step S119, the control computer 400 detects a character string <LoadFont> in the input XML file 11 in the subtitle file 10. In case it could detect a character string <LoadFont>, it goes to step S120 in which it will take, as N, the number of occurrences of the <LoadFont> tag included in the input XML file 11 in the subtitle file 10, describe it as "LoadFontNumber=N" and then add the description to the continuation of the header part of the internal file 40. On the contrary, if the control computer 400 could not detect any character string <LoadFont>, it goes to step S121 in which it will describe "LoadFontNumber=0" and then add the description to the continuation of the header part of the internal file 40.

Then, the control computer 400 repeats the operation in step S123 a number N of occurrences of the <LoadFont> tag. It should be noted that step S122 indicates the start point of the loop and step S124 indicates the end point of the loop.

In step S123, the control computer 400 reads the substantive data in a font file represented by a font file name <ID> indicated with the <LoadFont> tag, and adds the name <ID>, substantive data and file size to the continuation of the internal file 40.

Next in step S125, the control computer 400 detect a character string <SubtitleList> in the input XML file 11 in the subtitle file 10. Detection of no character string <SubtitleList> will cause the control computer 400 to abend. In case the control computer 400 could detect a character string <SubtitleList>, it will normally exit the procedure.

Generating the Text Data Part of the Internal File

Figure 8:
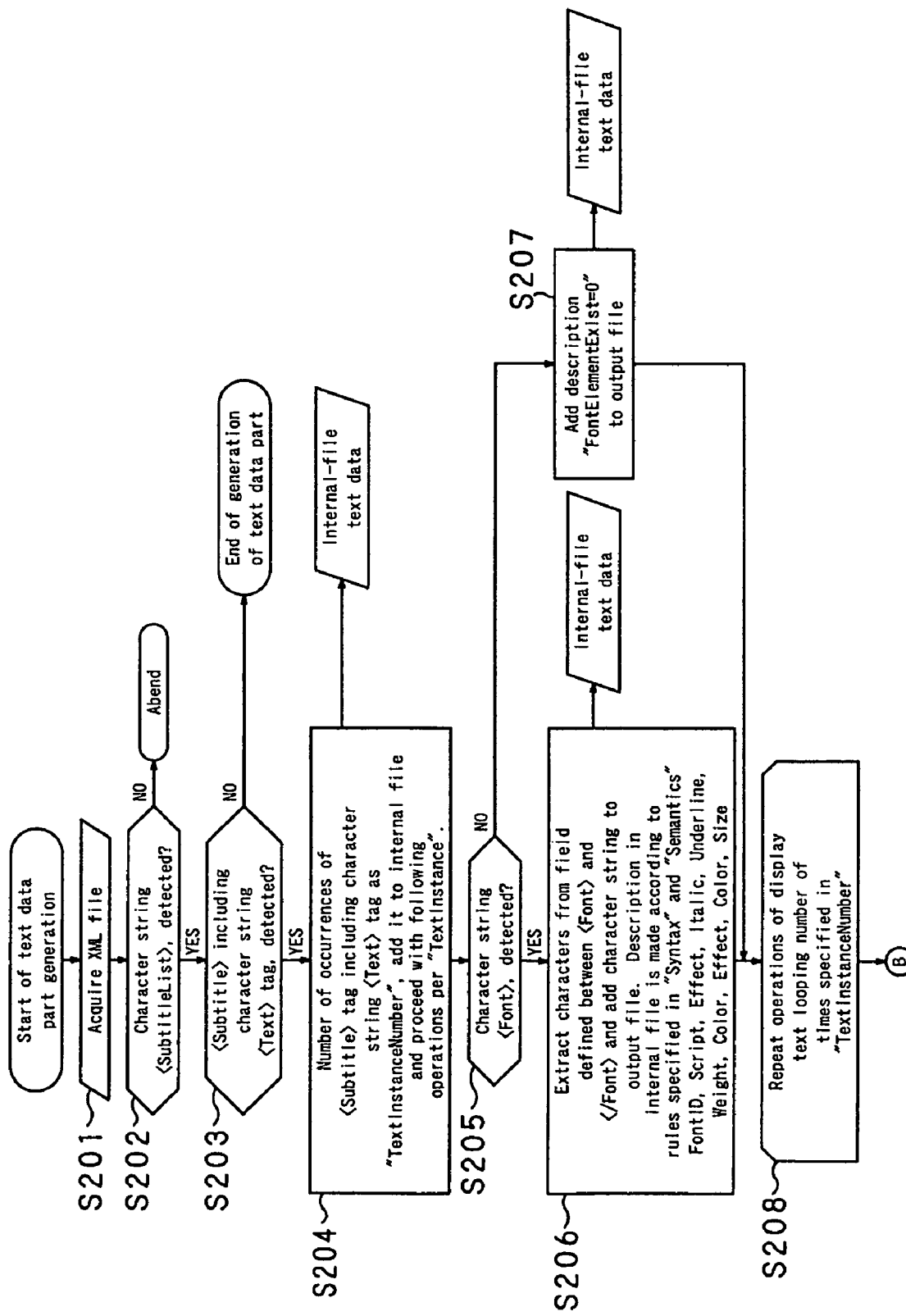
FIG. 8 shows a flow of operations made in generating a text data part of the internal file.
Figure 9:
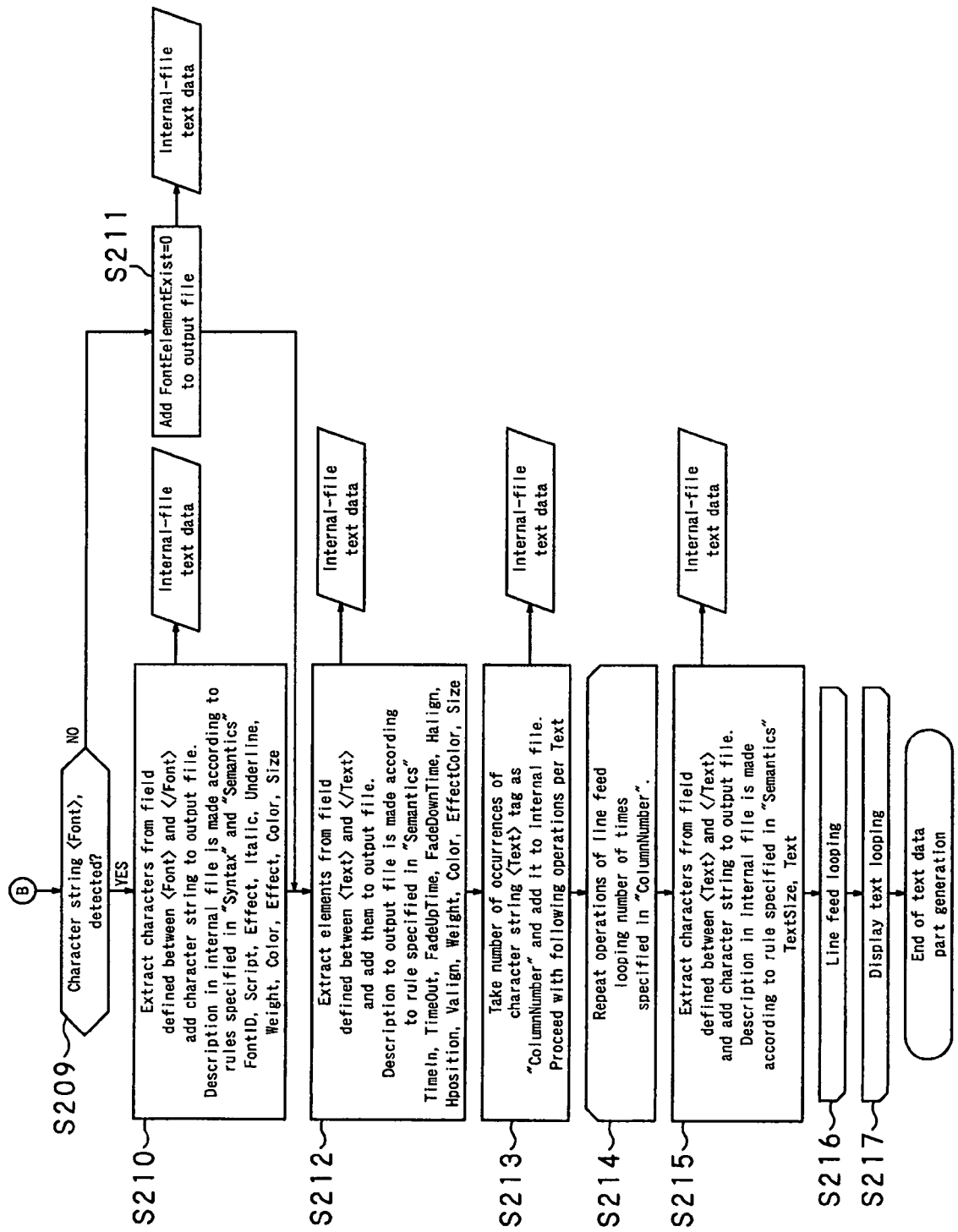
FIG. 9 shows a flow diagram continued from that in FIG. 8.

FIGS. 8 and 9 show flows of operations made in generating the text data part of the internal file 40 by the control computer 400.

First in step S201, the control computer 400 acquires the XML file 11 in the subtitle file 10 by reading it from the content storage unit 200.

Next in step S202, the control computer 400 detects a character string <SubtitleList> in the input XML file 11 in the subtitle file 10. Detection of no character string <SubtitleList> will cause the control computer 400 to abend.

Then in step S203, the control computer 400 detects <Subtitle> including a character string <Text> tag in the input XML file 11 in the subtitle file 10. If the control computer 400 could not detect any <Subtitle> including the character string <Text> tag, it will normally exit the procedure.

Further in step S204, the control computer 400 will take, as N, the number of occurrences of the <Subtitle> including the character string <Text> tag, included in the input XML file 11 in the subtitle file 10, describe it as "TextInstanceNumber=N" and then add the description to the continuation of the text data part of the internal file 40.

Thereafter, operations will be made as follows per TextInstance:

Next in step S205, the control computer 400 detects a character string <Font> in the input XML file 11 in the subtitle file 10. In case the control computer 400 could detected the character string <Font>, it goes to step S206 in which it will extract characters from a field defined between <Font> and </Font> in the input XML file 11 in the subtitle file 10 and add the character string to the continuation of the text data part in the internal file 40. It should be noted that the description in the internal file 40 is made according to the rules specified in "Syntax" and "Semantics" which will be explained later. On the contrary, if the control computer 400 could not detect any character string <Font>, it will add a description "FontElementExist=0" to the continuation of the text data part in the internal file 40 in step S207.

Next, the control computer 400 repeats operations of display text looping in step S208 and subsequent steps a number of times specified in "TextInstanceNumber". It should be noted that step S208 indicates the start point of the display text loop and step S217 indicates the end point of the display text loop.

Next in step S209, the control computer 400 detects a character string <Font> in the input XML file 11 in the subtitle file 10. In case the control computer 400 could detected the character string <Font>, it goes to step S210 in which it will extract characters from a field defined between <Font> and </Font> in the input XML file 11 in the subtitle file 10 and add the character string to the continuation of the text data part in the internal file 40. It should be noted that the description in the internal file 40 is made according to the rules specified in "Syntax" and "Semantics" which will be explained later. On the contrary, if the control computer 400 could not detect any character string <Font>, it will add a description "FontElementExist=0" to the continuation of the text data part in the internal file 40 in step S211.

Next in step S212, the control computer 400 extracts characters from a field defined between <Text> and </Text> in the input XML file 11 in the subtitle file 10, and adds the character string to the continuation of the text data part of the internal file 40. It should be noted that the description in the internal file 40 is made according to the rules specified in "Syntax" and "Semantics" which will be explained later.

Further in step S213, the control computer 400 will take, as N, the number of occurrences of the character string <Text> tag included in the input XML file 11 in the subtitle file 10, describe it as "ColumnNumber=N" and then add the description to the continuation of the text data part of the internal file 40.

Next, the control computer 400 repeats operations of line feed looping in step S214 and subsequent steps a number of times specified in "ColumnNumber". It should be noted that step S214 indicates the start point of the line feed loop and step S216 indicates the end point of the line feed loop.

Next in step S215, the control computer 400 extracts characters from a field defined between <Text> and </Text> in the input XML file 11 in the subtitle file 10, and adds the character string to the continuation of the text data part of the internal file 40. It should be noted that the description in the internal file 40 is made according to the rules specified in "Syntax" and "Semantics" which will be explained later.

Then, when the line feed loop and display text loop are complete, the control computer 400 will go through steps S216 and S217 and normally exit the procedure for generating the text data part.

Generating the Picture Data Part of the Internal File

Figure 10:
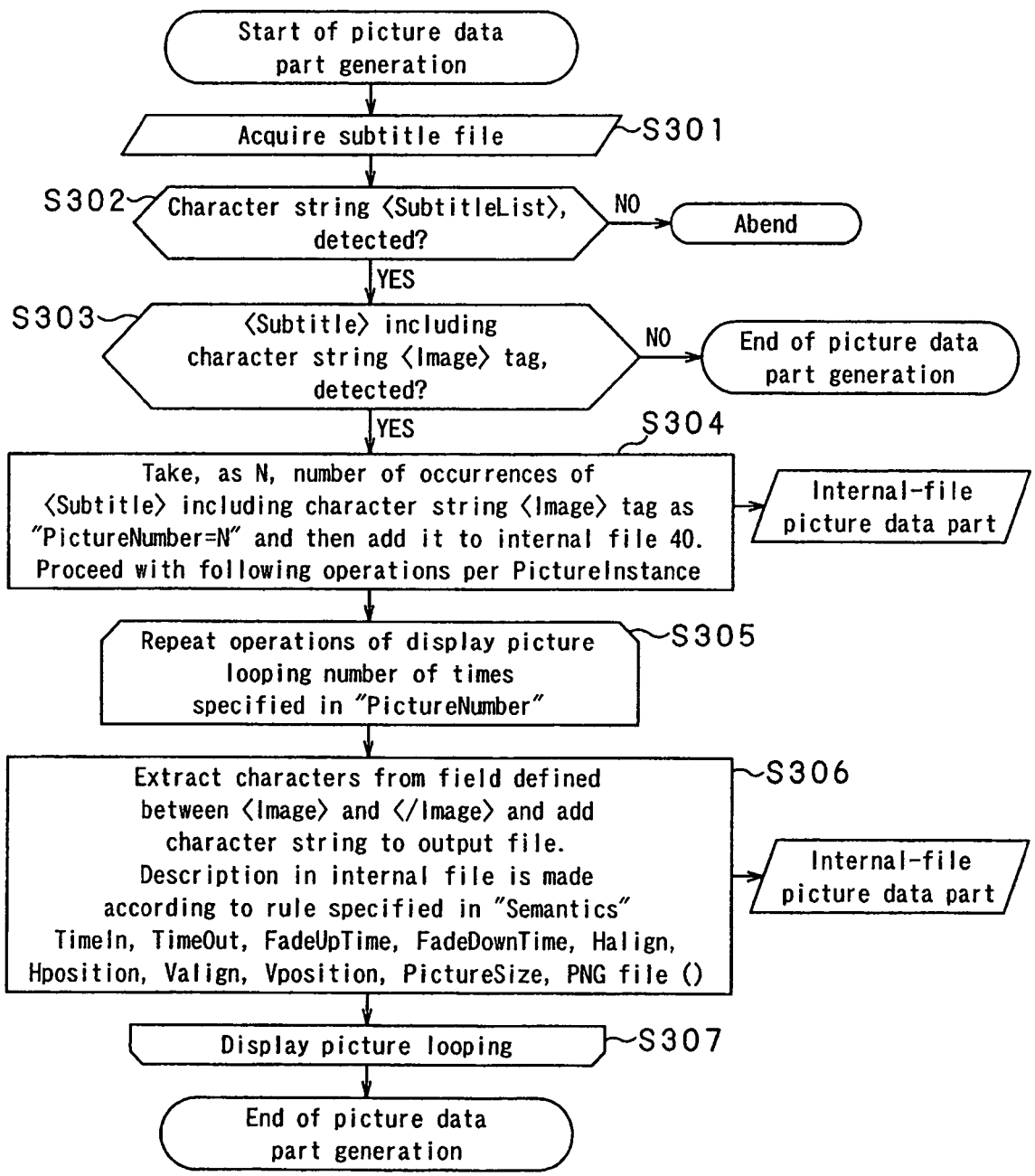
FIG. 10 shows a flow of operations made in generating a picture data part of the internal file.

The picture data part of the internal file is generated by the control computer 400 as will be described below with reference to FIG. 10.

First in step S301, the control computer 400 acquires the XML file 11 in the subtitle file 10 by reading it from the content storage unit 200.

Next in step S302, the control computer 400 detects a character string <SubtitleList> in the input XML file 11 in the subtitle file 10. Detection of no character string <SubtitleList> will cause the control computer 400 to abend.

Then in step S303, the control computer 400 detects <Subtitle> including a character string <Image> tag in the input XML file 11 in the subtitle file 10. If the control computer 400 could not detect any <Subtitle> including the character string <Image> tag, it will normally exit the procedure.

Further in step S304, the control computer 400 will take, as N, the number of occurrences of the <Subtitle> including the character string <Image> tag, included in the input XML file 11 in the subtitle file 10, describe it as "PictureNumber=N" and then add the description to the continuation of the text data part of the internal file 40.

Thereafter, operations will be made as follows per PictureInstance:

Next, the control computer 400 repeats operations of display picture looping in step S305 and subsequent steps a number of times specified in "PictureNumber". It should be noted that step S305 indicates the start point of the display picture loop and step S307 indicates the end point of the display picture loop.

Next in step S306, the control computer 400 extracts characters from a field defined between <Image> and </Image> in the input XML file 11 in the subtitle file 10 and adds the character string to the continuation of the text data part in the internal file 40. It should be noted that the description in the internal file 40 is made according to the rules specified in "Syntax" and "Semantics" which will be explained later.

If a PNG file (PNGfile( )) is included in the subtitle file 10 at this time, the control computer 400 will read the PNG file 13 as the substantive data and assign it to the picture part of the internal file 40.

Then, when the display picture loop is complete, the control computer 400 will go through step S307 and normally exit the procedure for generating the picture data part.

Generating the Index Part of the Internal File

Figure 11:
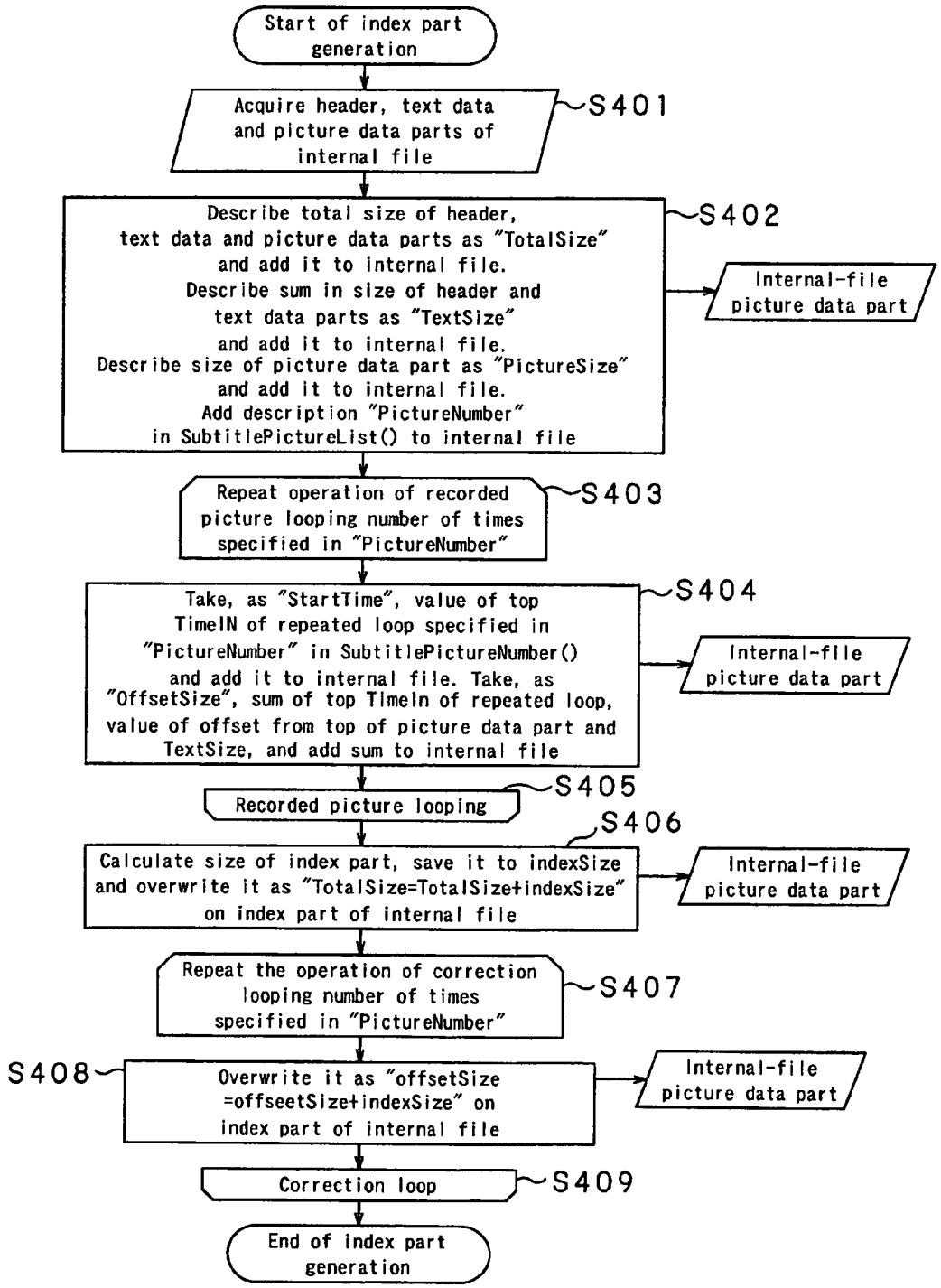
FIG. 11 shows a flow of operations made in generating an index part of the internal file.

The index part of the internal file is generated by the control computer 400 as will be described below with reference to the flow diagram in FIG. 11.

First in step S401, the control computer 400 acquires the header part, text data part and picture data part of the internal file, having been generated so far, by reading them from the content storage unit 200.

Next in step S402, the control computer 400 describes the total size of the header, text data and picture data parts as "TotalSize" and adds it to the continuation of the index part of the internal file 40. Also, the control computer 400 describes the sum in size of the header and text data parts as "TextSize" and adds it to the continuation of the index part of the internal file 40. Also, the control computer 400 describes the size of the picture data part as "PictureSize" and adds it to the continuation of the index part of the internal file 40. Also, the control computer 400 adds the description "PictureNumber" in each picture data part to the continuation of the index part of the internal file 40.

Next, the control computer 400 repeats the operations of recorded picture looping in steps S403 to S405 a number of times specified in "PictureNumber". It should be noted that step S403 indicates the start point of the recorded picture loop and step S405 indicates the end point of the recorded picture loop.

In step S404 in the recorded picture loop, the control computer 400 takes, as "StartTime", the value of the top TimeIN of the repeated loop specified in "PictureNumber" described in the picture data part, and adds it to the continuation of the index part of the internal file 40. Also, the control computer 400 takes, as "OffsetSize", the sum of the top TimeIN of the repeated loop specified in. "PictureNumber" described in the picture data part, value of offset from the top of the picture data part and TextSize, and adds the sum to the continuation of the index part of the internal file 40.

Next in step S406, the control computer 400 calculates the size of the index part, takes the calculated size as "indexsize" and adds it to the continuation of the index part of the internal file 40. Also, the control computer 400 corrects the existing description "TotalSize" to "TotalSize=TotalSize+indexsize", and overwrites it on the index part of the internal file 40.

Next, the control computer 400 repeats the operations of correction looping in steps S407 to S409 a number of times specified in "PictureNumber". Step S407 indicates the start point of the correction loop and step S409 indicates the end point of the correction loop.

In step S408 in the correction loop, the control computer 400 the existing description "OffsetSize" to "offsetSize=offsetSize+indexsize" and overwrites it on the index part of the internal file 40.

When the correction loop is complete, the control computer 400 will go through step S408 and normally exit the procedure for generating the index part.

Transferring the Internal File

As above, the data size of each of the header, text data and picture data parts is described in the index part of the internal file. Further, each display picture element (per scene, for example) of each subtitle of the picture data part has its data size and display start time described being offset from the top of the index part.

Thus, at the time of screening a movie, the host CPU 113 will appropriately transfer data from the data storage unit 200 to the subtitle memory 136 while the subtitle processor 131 is processing a subtitle. At this time, the host CPU 113 will be able to calculate the share, by data, of the subtitle memory 136 on the basis of the data size and display start time of each element, and control the data transfer for the data not to overflow the subtitle memory 136. Therefore, the subtitle processor 131 has not to issue any data read command or the like, and has not to calculate the capacity of the subtitle memory 136 by analyzing the XML file. Thus, it is possible to considerably reduce the burden of subtitle processing.

Figure 12:
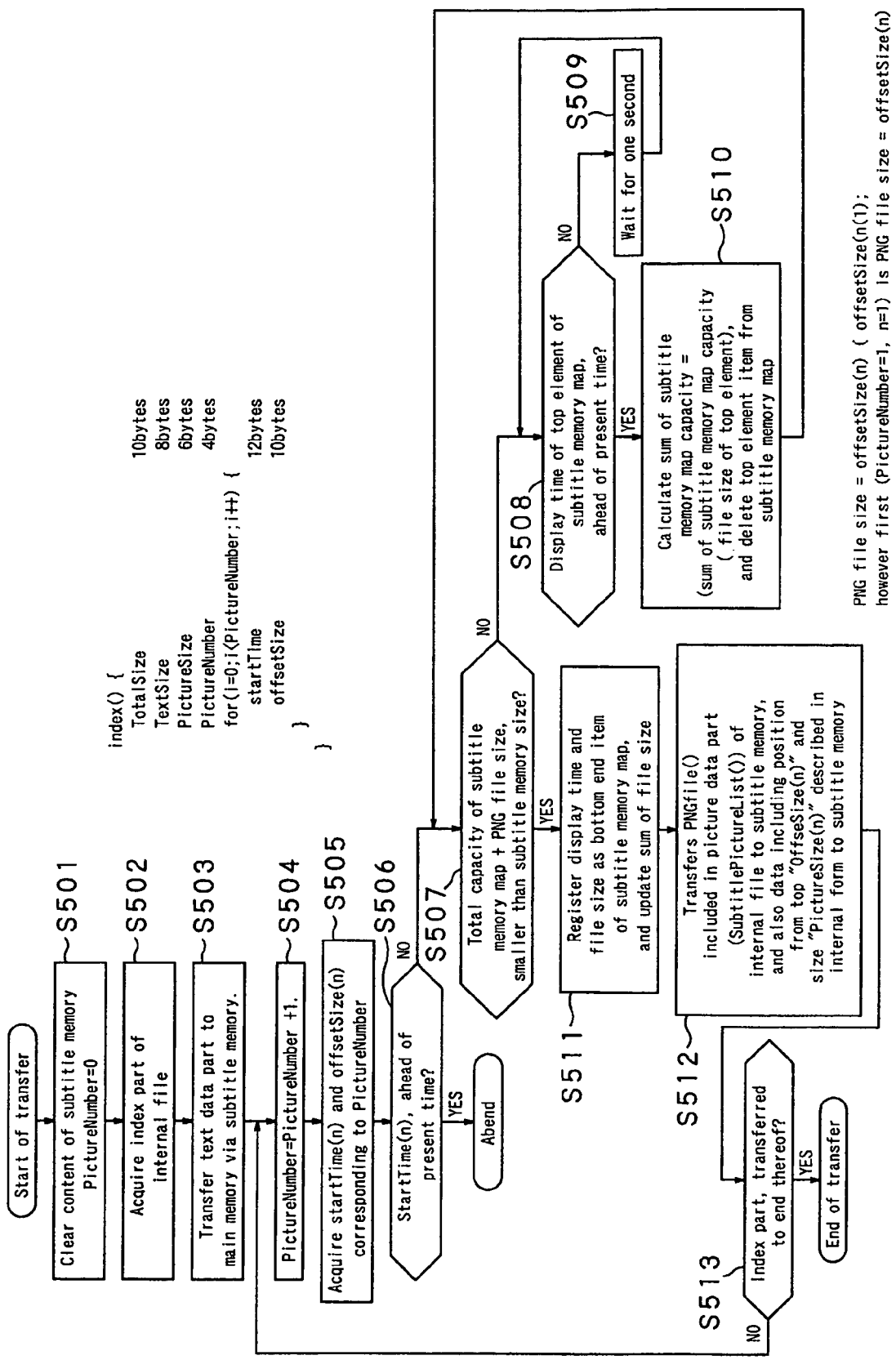
FIG. 12 shows a flow of operations made in transferring the internal file.

More specifically, when the internal file 40 is transferred from the content storage unit 200 to the subtitle memory 136 of the subtitle processing circuit 130, the host CPU 113 operates to transfer the internal file 40 as will be described below with reference to FIG. 12.

First in step S501, the host CPU 113 clears the content of a map for management of the data share of the subtitle memory 136 and sets the variable PictureNumber to 0.

Next in step S502, the host CPU 113 acquires the index part of the internal file 40 by reading it from the content storage unit 200.

Next in step S503, the host CPU 113 transfers the text data part of the internal file 40 to the main memory 133 as the working memory of the subtitle processor 131 via the subtitle memory 136.

Next in step S504, the host CPU 113 calculates

PictureNumber=PictureNumber+1.

Next in step S505, the host CPU 113 acquires startTime(n) and offsetSize(n) corresponding to PictureNumber in the input index part.

Next in step S506, the host CPU 113 judges whether start-Time(n) is ahead of the present time. In case the host CPU 113 has determined in step S506 that startTime(n) is ahead of the present time, it will abend.

Then in step S507, the host CPU 113 makes a comparison in capacity between the sum of subtitle memory map capacity+PictureSize and the subtitle memory 136. In case the result of comparison shows that the subtitle memory 136 is larger in capacity, the host CPU 113 goes to step S511. On the contrary, if the sum of subtitle memory map capacity+PictureSize is larger in capacity, the host CPU 113 will wait in step S508.

In step S508, the host CPU 113 judges whether the display time of the top element of the subtitle memory map is ahead of the present time. If the display time is not ahead of the present time, the host CPU 113 will wait for one second in step S509 and then retry the operation in step S508. The host CPU 113 will wait in step S508 until the present time passes by the display time of the top element of the subtitle memory map.

After going through step S508, the host CPU 113 will calculate the sum of subtitle memory map capacity=(sum of subtitle memory map capacity−file size of the top element) in step S510, and delete the top element item from the subtitle memory map.

After going through step S510, the host CPU 113 goes to step S507 in which it will retry a comparison in capacity between the sum of subtitle memory map capacity+Picture-Size and the subtitle memory 136.

In case the result of comparison is that the capacity of the subtitle memory 136 is larger than the sum of subtitle memory map capacity+PictureSize, the host CPU 113 will go through step S507 to step S511.

In step S511, the host CPU 113 registers the file size and display time of a new element in the bottom item of the subtitle memory map, and updates the total file size.

Next in step S512, the host CPU 113 transfers PNGfile( ) included in the picture data part of the internal file 40 from the data storage unit 200 to the subtitle memory 136. At this time, the host CPU 113 extracts the PNGfile( ) from the internal file 40 in reference to the offset (OffsetSize(n)) and size (PictureSize(n)) indicating positions from the top and transfers it to the subtitle memory 136.

Next in step S513, the host CPU 113 judges whether the transfer has been made down to the end of the index part. If the transfer has not been made down to the end of the index part, the host CPU 113 returns to step S504 in which it will make the transfer of a next picture.

In case the host CPU 113 has determined that the transfer has been made down to the end of the index part, it will exit this transfer.

First Variant of the Content Decoder

Next, a first variation of the content decoder 100 will be explained below with reference to FIG. 13.

Figure 13:
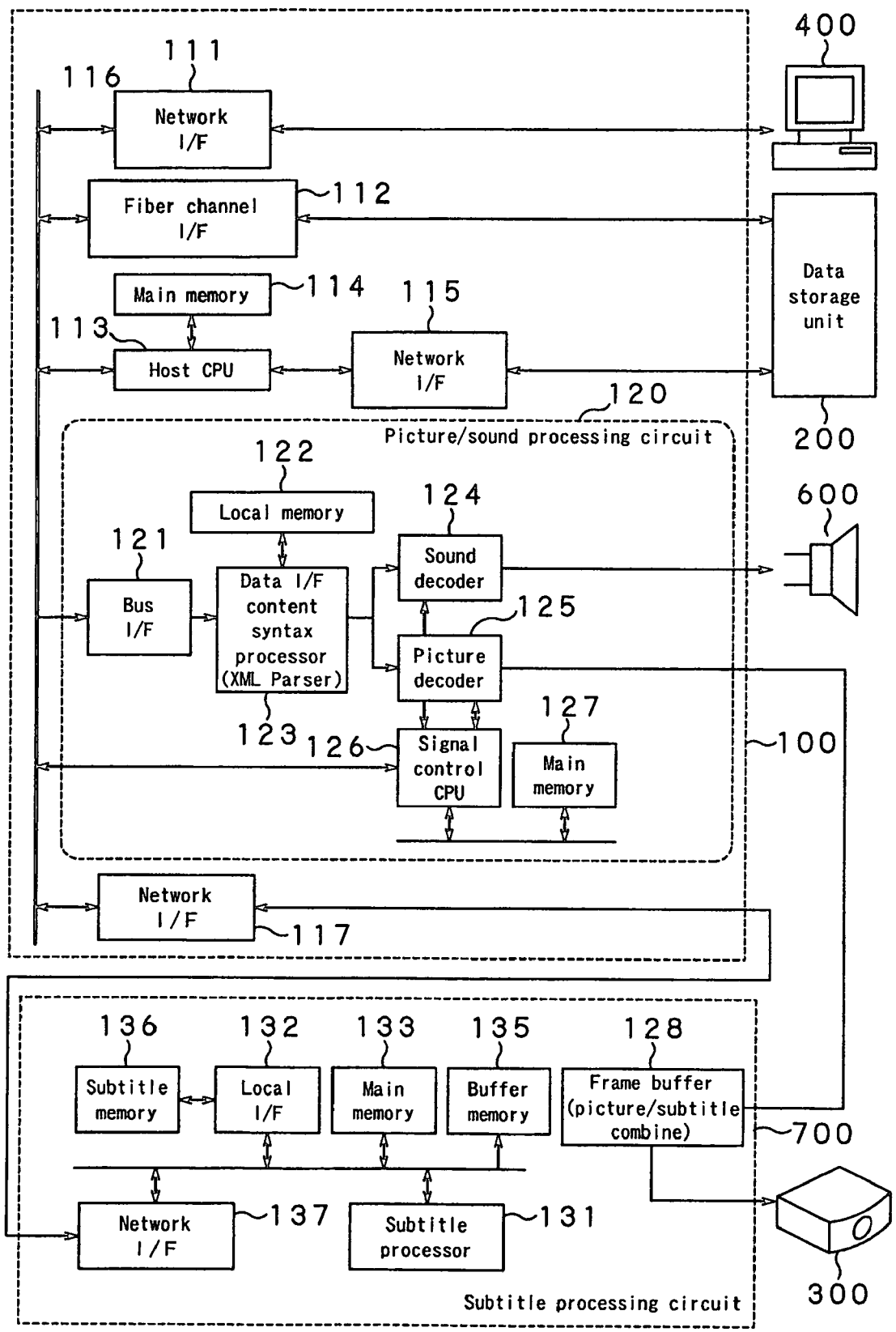
FIG. 13 is a block diagram of a first variant of the content decoder.

The first variant shown in FIG. 13 is a version of the content decoder 100 of which the subtitle processing circuit 130 is provided separately as a subtitle processing/displaying unit 700. In this variant, the subtitle processing/displaying unit 700 includes all the internal components of the subtitle processing circuit 130, and further includes a network interface 137 and frame buffer 128. Also, the content decoder 100 additionally includes a network interface 117.

The subtitle processing/displaying unit 700 receives the internal file 40 transferred from the content decoder 100 via the network interface 137, and decodes a subtitle. Also, in the subtitle processing/displaying unit 700, picture data decoded by the content decoder 100 is stored in the frame buffer 128 in which it will be combined with a subtitle image. The synthetic data is supplied to the picture output unit 300.

Second Variant of the Content Decoder

Figure 15:
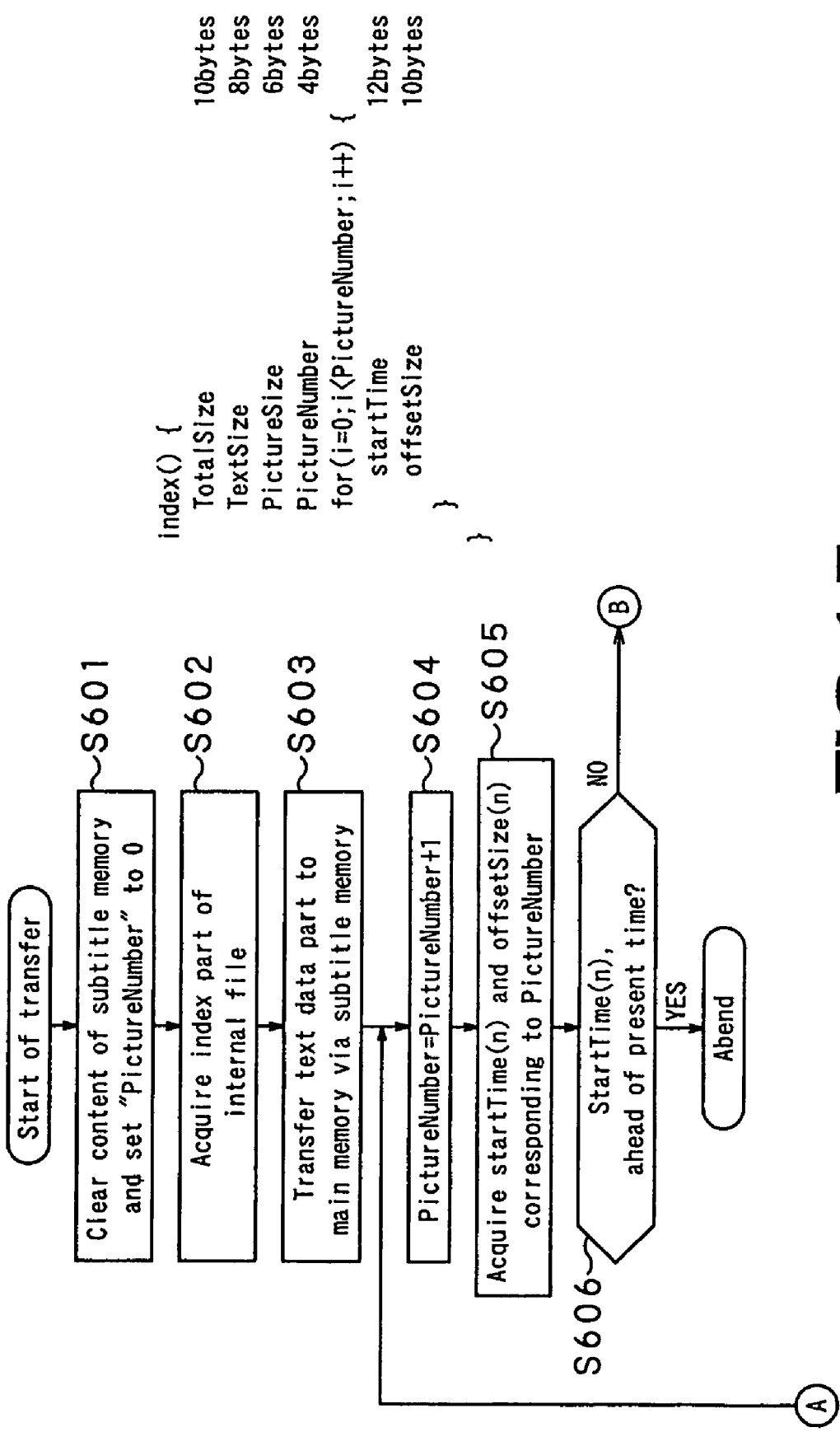
FIG. 15 shows a flow of operations made in transferring the internal file in the second variant in FIG. 14.
Figure 16:
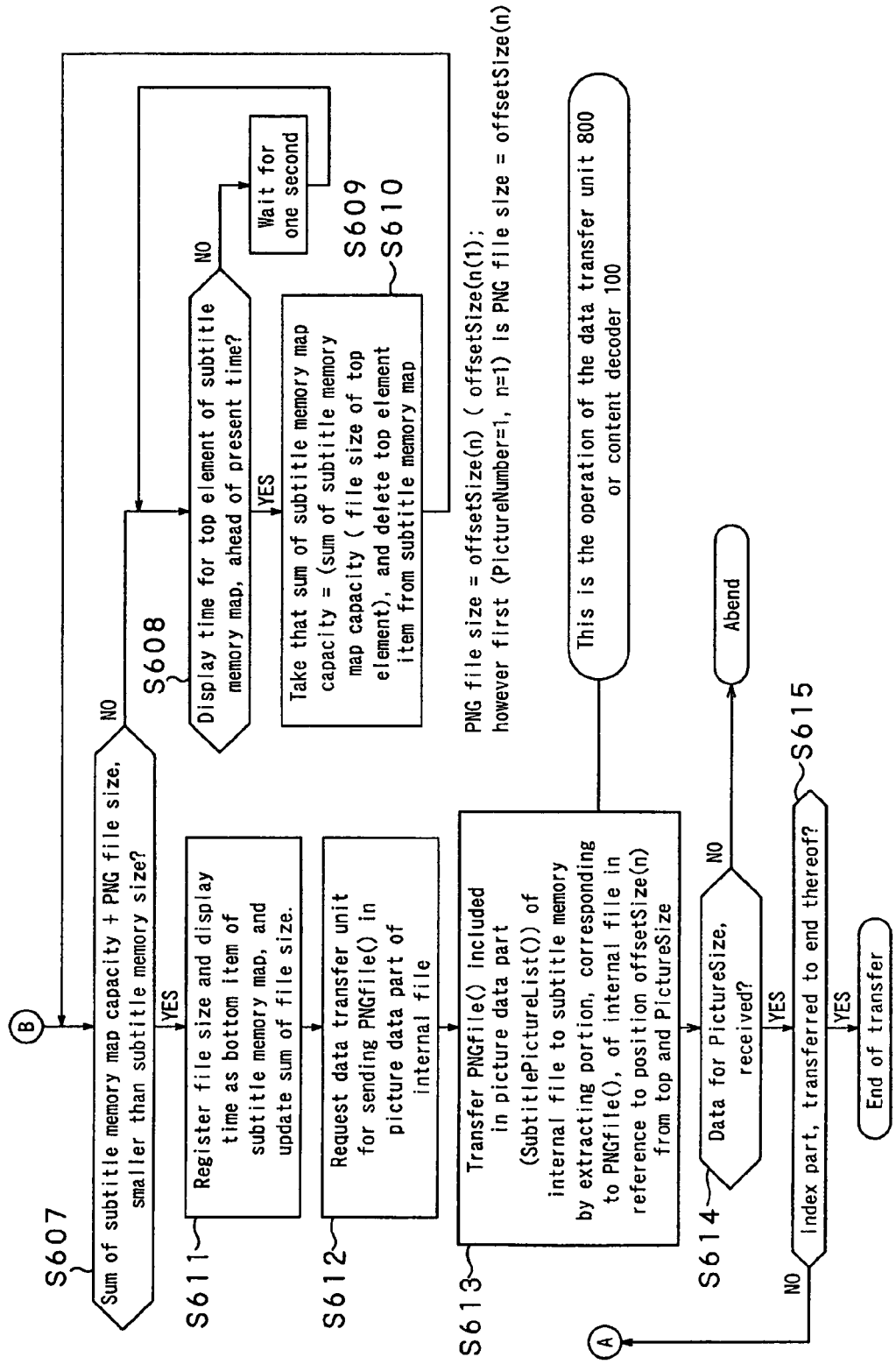
FIG. 16 shows a flow diagram continued from that in FIG. 15.

Next, a second variant of the content decoder 100 will be explained below with reference to FIGS. 14, 15 and 16.

Figure 14:
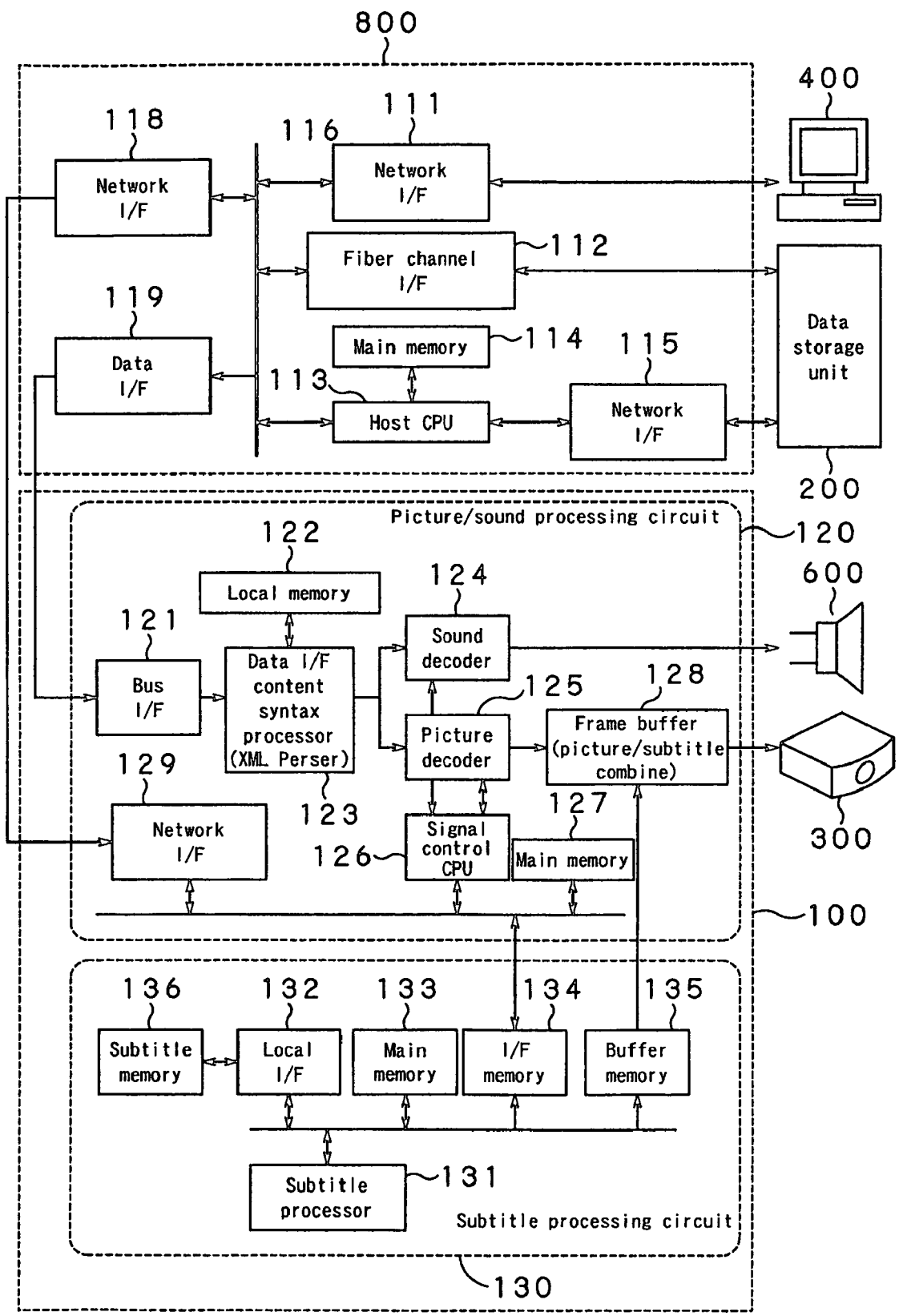
FIG. 14 is a block diagram of a second variant of the content decoder.

The second variant shown in FIG. 14 is a version of the content decoder 100 of which a portion to transfer data is provided separately as a data transfer unit 800.

In this variant, the data transfer unit 800 includes a first network interface 111, fiber channel interface 112, host CPU 113, main memory 114 and second network interface 115 and also a network interface 118 and data interface 119. Also, the picture/sound processing circuit 120 of the content decoder 100 includes a data interface 121 in place of the bus interface 121 and a network interface 129.

The data transfer unit 800 transfers the internal file 40 to the content decoder 100 via the network interface 118. It also transfers the picture file 20 and sound file 30 stored in the content storage unit 200 to the data interface content syntax processor 123 via the data interfaces 119 and 121. A signal such as display start command or the like is transferred to the content decoder 100 via the network interface 118.

In the second variant, the subtitle processor 131 will transfer the internal file 40 from the content storage unit 200 to the subtitle memory 136 of the subtitle processing circuit 130 as will be described below. FIGS. 15 and 16 show flows of operations made in the subtitle processor 131 for transferring the internal file 40.

First in step S601, the subtitle processor 131 clears the content of the data share management map of the subtitle memory 136 and sets the variable "PictureNumber" to 0.

Next in step S602, the subtitle processor 131 acquires the index part of the internal file 40 from the content storage unit 200 via the data transfer unit 800 controlled by the host CPU 113.

Next in step S603, the subtitle processor 131 transfers the text data part of the internal file 40 to the main memory 133 as the working memory of the subtitle processor 131 via the subtitle memory 136.

Next in step S604, the subtitle processor 131 detects whether transfer of the total size of the transferred index part and text data part has been complete. For this purpose, a certain time limit is set, and when the transfer has not been complete with the time limit, the subtitle processor 131 will abend. In case the transfer has been complete, the subtitle processor 131 will go to step S605.

Next in step S605, the subtitle processor 131 calculates

PictureNumber=PictureNumber+1.

Also in step S605, the subtitle processor 131 will acquire startTime(n) and offsetSize(n) corresponding to PictureNumber of the input index part.

Next in step S606, the subtitle processor 131 judges whether startTime(n) is ahead of the present time. If it is determined in step S606 that startTime(n) is ahead of the present time, the subtitle processor 131 will abend.

Next in step S607, the subtitle processor 131 makes a comparison between the sum of subtitle memory map capacity+PictureSize and that of the subtitle memory 136. In case the result of comparison shows that the capacity of the subtitle memory 136 is larger, the subtitle processor 131 goes to step S611. If the subtitle memory map+PictureSize is determined to be larger, the subtitle processor 131 will go to step S608.

In step S608, the subtitle processor 131 judges whether the display time for the top element of the subtitle memory map is ahead of the present time. If the display time is determined not to be not ahead of the present time, subtitle processor 131 will wait for one second in step S609 and retry the operation in step S608, and wait in step S608 until the display time for the top element of the subtitle memory map passes.

After going through step S608, the subtitle processor 131 will take that the sum of subtitle memory map capacity=(sum of subtitle memory map capacity−file size of the top element) in step S610, and delete the top element item from the subtitle memory map.

After going through step S610, the subtitle processor 131 goes to step S607 in which it will make a comparison between the sum of subtitle memory map capacity+PictureSize and the capacity of the subtitle memory map 136 again.

When the capacity of the subtitle memory 136 is larger than between the sum of subtitle memory map capacity+PictureSize, the subtitle processor 131 will go through step S607 to step S611.

In step S611, the subtitle processor 131 registers the file size and display time of a new element at the bottom item of the subtitle memory map, and updates the sum of file size.

Next in step S612, the subtitle processor 131 requests the data transfer unit 800 controlled by the host CPU 113 for sending picture data corresponding to PictureNumber.

Upon request from the subtitle processor 131, the data transfer unit 800 controlled by the host CPU 113 will transfer PNGfile( ) included in the picture data part of the internal file 40 from the content storage unit 200 to the subtitle memory 136 in step S613. For this transfer, the data transfer unit 800 extracts a portion, corresponding to PNGfile( ), of the internal file 40 in reference to a position offsetSize(n) from the top and PictureSize(n).

Next in step S614, the subtitle processor 131 detects whether transfer of the total size of the picture data for PictureSize has been complete. For this purpose, a certain time limit is set, and when the transfer has not been complete within the time limit, the subtitle processor 131 will abend. In case the transfer has been complete, the subtitle processor 131 will go to step S615.

Next in step S615, the subtitle processor 131 judges whether the index part has been transferred to the end thereof. If the index part has not been transferred to the end thereof, the subtitle processor 131 returns to step S604 in which it will process a next picture.

In case the subtitle processor 131 has determined in step S615 that the index part has been transferred to the end thereof, it exits the transfer procedure.

Figure 17:
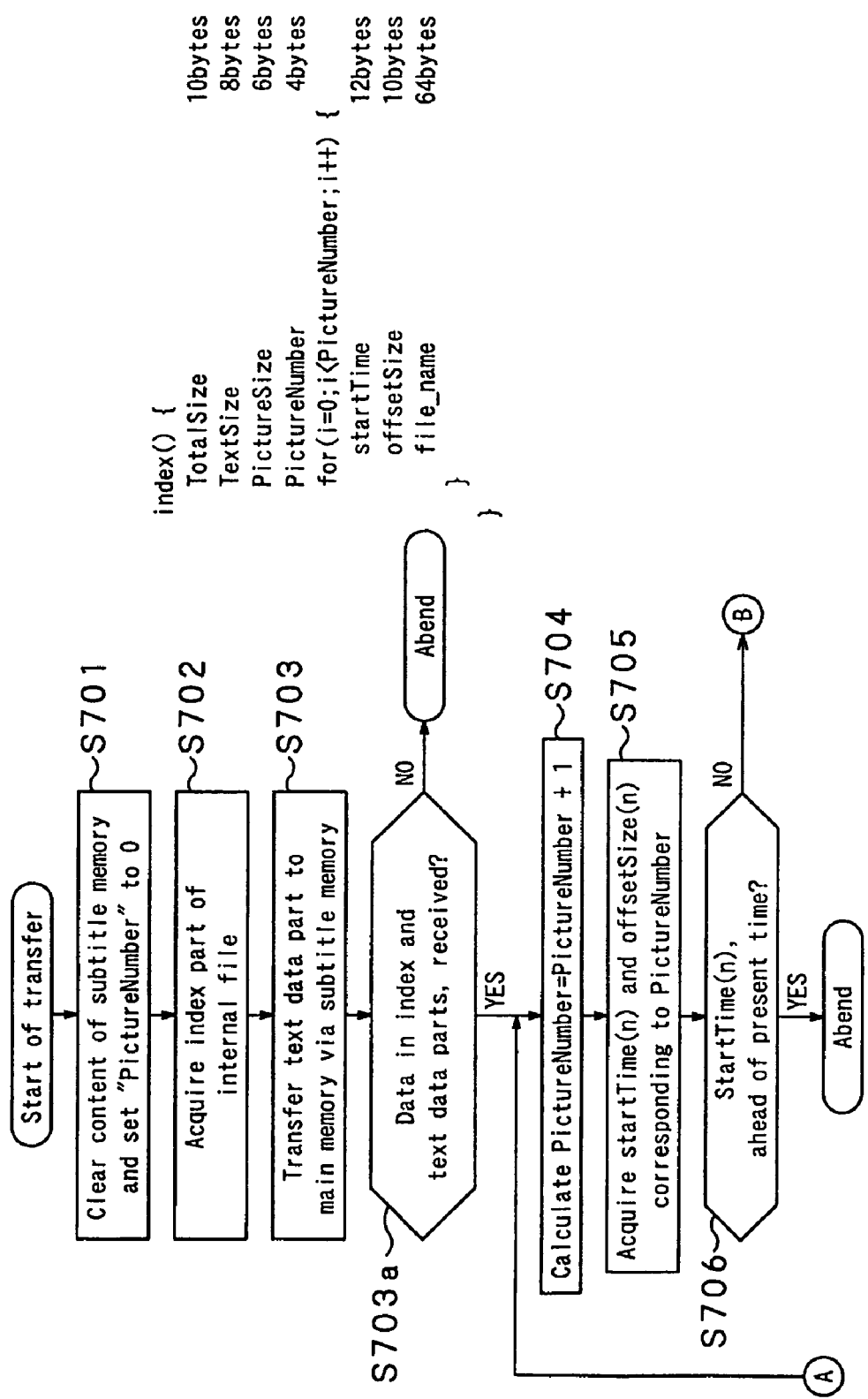
FIG. 17 shows a flow of operations made in another transfer of the internal file in the second variant.
Figure 18:
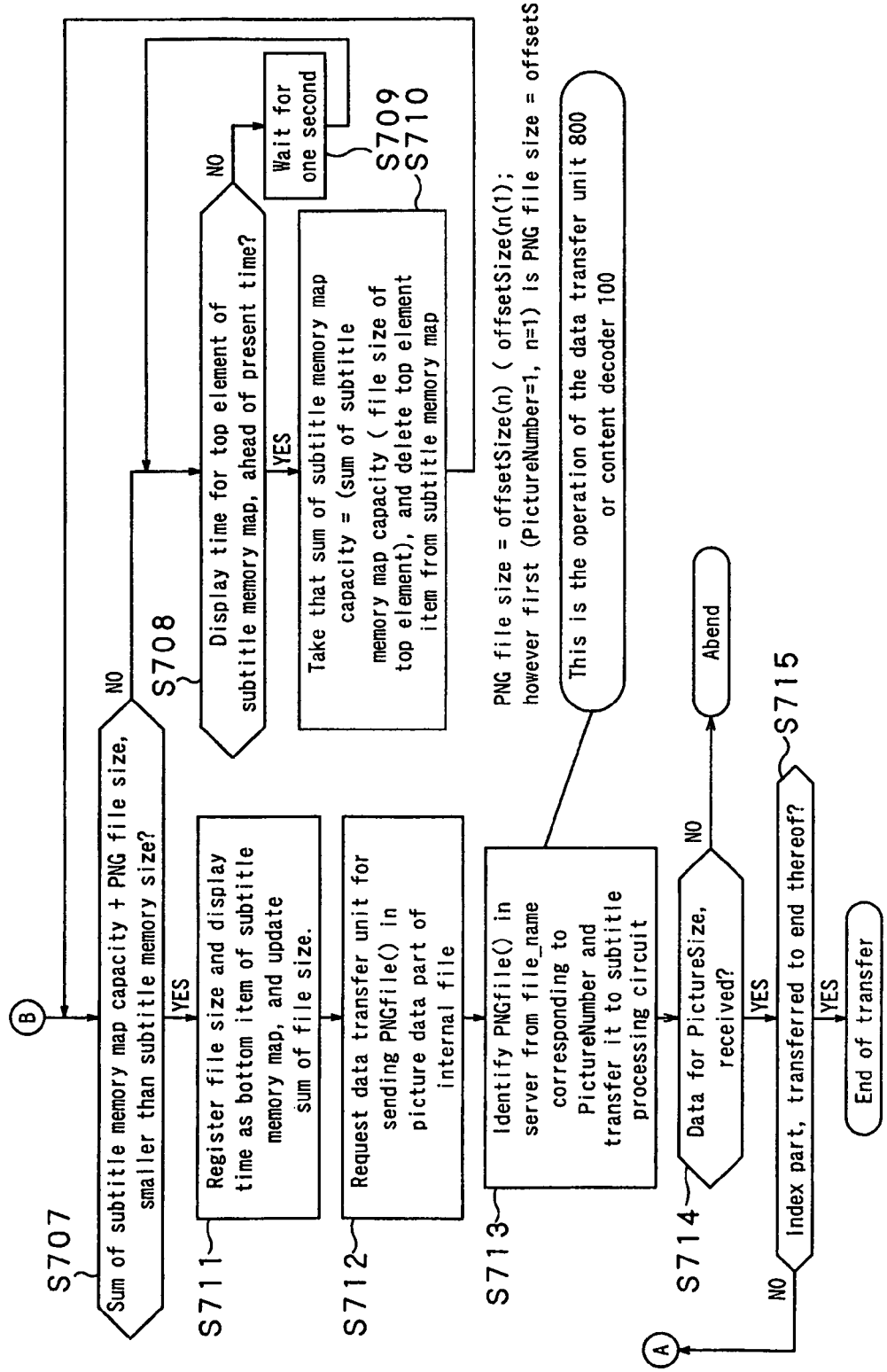
FIG. 18 is a flow diagram continued from that in FIG. 17.

In a second example of the transfer in the second variant, the internal file 40 is transferred by the subtitle processor 131 from the content storage unit 200 to the subtitle memory 136 of the subtitle processing circuit 130 as will be explained below. In this example, the data occupancy in the subtitle memory 136 is managed based on the index data arranged as the internal file, and a PNG file stored in the content storage unit 200 is transferred. FIGS. 17 and 18 show flows of operations made in data processing by the subtitle processor 131 for transfer of the internal file 40. As shown in FIGS. 17 and 18, a corresponding file_name in the content storage unit 200 is described per PictureNumber.

First in step S701, the subtitle processor 131 clears the content of the data share management map of the subtitle memory 136 and sets the variable "PictureNumber" to 0.

Next in step 702, the subtitle processor 131 acquires the index part of the internal file 40 from the content storage unit 200 via the data transfer unit 800 controlled by the host CPU 113.

Next in step S703, the subtitle processor 131 transfers the text data part of the internal file 40 to the main memory 133 as the working memory of the subtitle processor 131 via the subtitle memory 136.

Next in step S703a, the subtitle processor 131 detects whether transfer of the total size of the transferred index part and text data part has been complete. For this purpose, a certain time limit is set, and when the transfer has not been complete with the time limit, the subtitle processor 131 will abend. In case the transfer has been complete, the subtitle processor 131 will go to step S704.

Next in step S704, the subtitle processor 131 calculates

PictureNumber=PictureNumber+1.

Also in step S705, the subtitle processor 131 will acquire startTime(n) and offsetSize(n) corresponding to PictureNumber of the input index part.

Next in step S706, the subtitle processor 131 judges whether startTime(n) is ahead of the present time. If it is determined in step S706 that startTime(n) is ahead of the present time, the subtitle processor 131 will abend.

Next in step S707, the subtitle processor 131 makes a comparison between the sum of subtitle memory map capacity+PictureSize and that of the subtitle memory 136. In case the result of comparison shows that the capacity of the subtitle memory 136 is larger, the subtitle processor 131 goes to step S711. If the subtitle memory map+PictureSize is determined to be larger, the subtitle processor 131 will go to step S708.

In step S708, the subtitle processor 131 judges whether the display time for the top element of the subtitle memory map is ahead of the present time. If the display time is determined not to be not ahead of the present time, subtitle processor 131 will wait for one second in step S709 and retry the operation in step S708, and wait in step S708 until the display time for the top element of the subtitle memory map passes.

After going through step S708, the subtitle processor 131 will take that the sum of subtitle memory map capacity=(sum of subtitle memory map capacity−file size of the top element) in step S710, and delete the top element item from the subtitle memory map.

After going through step S710, the subtitle processor 131 goes to step S707 in which it will make a comparison between the sum of subtitle memory map capacity+PictureSize and the capacity of the subtitle memory map 136 again.

When the capacity of the subtitle memory 136 is larger than the sum of subtitle memory map capacity+PictureSize, the subtitle processor 131 will go through step S707 to step S711.

In step S711, the subtitle processor 131 registers the file size and display time of a new element at the bottom item of the subtitle memory map, and updates the sum of file size.

Next in step S712, the subtitle processor 131 requests the data transfer unit 800 controlled by the host CPU 113 for sending picture data corresponding to PictureNumber.

Upon request from the subtitle processor 131, the data transfer unit 800 controlled by the host CPU 113 will identify PNGfile( ) on the basis of file_name corresponding to PictureNumber and transfer it from the content storage unit 200 to the subtitle memory 136 in step S713.

Next in step S714, the subtitle processor 131 detects whether transfer of the total size of the picture data for PictureSize has been complete. For this purpose, a certain time limit is set, and when the transfer has not been complete within the time limit, the subtitle processor 131 will abend. In case the transfer has been complete, the subtitle processor 131 will go to step S715.

Next in step S715, the subtitle processor 131 judges whether the index part has been transferred to the end thereof. If the index part has not been transferred to the end thereof, the subtitle processor 131 returns to step S704 in which it will process a next picture.

In case the subtitle processor 131 has determined in step S715 that the index part has been transferred to the end thereof, it exits the transfer procedure.

Other Example of the Construction of the Internal File 40

In the aforementioned digital movie screening system, the internal file 40 has the index, header, text data and picture data parts successively described therein and these parts are handled as one file.

According to the present invention, however, these parts may be formed as separate files, respectively. Namely, they may be handled as four files.

Also, since in the index part, there are described lengths of time taken for reading, and capacities, of the header, text data and picture data parts, only the index part may be formed as a separate file while the header, text data and picture data parts may be formed together as a single file.

Also, since the picture data part includes image data, it will be larger in data size than the other parts. Therefore, only the picture data part may be formed as a separate file while the index, header and text data parts may be formed together as one file.

For the data transfer, the index part may be recorded singly as an internal file while the subtitle main file, one or more font files including font data on the text data and one or more picture files including image data may be recorded as in the past.

Examples of Descriptions in the Subtitle and Internal Files

There will be given below examples of descriptions in the subtitle file 10 and internal file 40.

```
<?xml version="1.0" encoding="UTF-8"?>
    <SubtitleReel
xmlns="http://www.smpte-ra.org/415M/2005/DCST-1#"
xmlns:xsi="http://www.w3.org/2001/XMLSchema-instance"
xsi:schemaLocation="http://www.smpte-ra.org/415M/2005/DCST-1#">
    <ID>b0d9a865-0909-4024-b04a-1145ee4a0001</ID>
    <ContentTitleText Language="en">Subtitle sample</ContentTitleText>
    <AnnotationText Language="ja">
        xml Sample file of subtitle data (subtitle.xml).
    </AnnotationText>
    <IssueDate>2004-10-20T20:00:00Z</IssueDate>
    <ReelNumber>1</ReelNumber>
    <Language>ja</Language>
    <StartTime>00:00:00:000</StartTime>
    <LoadFont          ID="Movie          subtitle          font
1">.¥STP¥font¥MovieFont1.ttf</LoadFont>
    <LoadFont          ID="Movie          subtitle          font
2">.¥STP¥font¥MovieFont2.ttf</LoadFont>
    <LoadFont          ID="Movie          subtitle          font
3">.¥STP¥font¥MovieFont3.ttf</LoadFont>
    <SubtitleList>
        <Font ID="Movie subtitle font 1" Script="normal" Effect="border"
            Italic="no" Underline="no" Weight="normal"
            Color="FFFFFFFF" EffectColor="FF000000" Size="42">
            <Subtitle SpotNumber="1"
                TimeIn="00:00:05:000" TimeOut="00:00:15:000"
                FadeUpTime="00:00:00:020" FadeDownTime="00:00:00:020">
                <Image Halign="center" Hposition="0"
                    Valign="bottom" Vposition="10">
                    .¥STP¥PNG¥PNG001.png
                </Image>
            </Subtitle>
            <Subtitle SpotNumber="2"
                TimeIn="00:00:09:000" TimeOut="00:00:12:000"
                FadeUpTime="00:00:00:020" FadeDownTime="00:00:00:020">
                <Text Halign="center" Hposition="0"
                    Valign="bottom" Vposition="10" Direction="ltr">
            Characters by movie subtitle font 1
                </Text>
            </Subtitle>
        </Font>
        <Subtitle SpotNumber="3"
            TimeIn="00:00:13:000" TimeOut="00:00:16:000"
            FadeUpTime="00:00:00:020" FadeDownTime="00:00:00:020">
            <Font ID="Movie subtitle font 3" Script="normal"
            Effect="border"
                Italic="no" Underline="no" Weight="normal"
                Color="FFFFFFFF" EffectColor="FF000000" Size="42">
                <Text Halign="center" Hposition="0"
                    Valign="bottom" Vposition="10" Direction="ltr">
            Characters by movie subtitle font 3
                </Text>
                <Text Halign="center" Hposition="0"
                    Valign="bottom" Vposition="4" Direction="ltr">
            Characters in second line
                </Text>
            </Font>
        </Subtitle>
        <Subtitle SpotNumber="1"
            TimeIn="00:00:17:000" TimeOut="00:00:27:000"
            FadeUpTime="00:00:00:020" FadeDownTime="00:00:00:020">
            <Image Halign="center" Hposition="0"
                Valign="bottom" Vposition="10">
                .¥STP¥PNG¥PNG002.png
            </Image>
        </Subtitle>
    </SubtitleList>
</SubtitleReel>
```

Next, there is shown an example of description "Syntax" in the internal file 40 in which the aforementioned subtitle data 10 is integrated.

```
index( ) {
  TotalSize                                    10 bytes
  TextSize                                     8 bytes
  PictureSize                                  6 bytes
  PictureNumber                                4 bytes
  for(i=0; i<PictureNumber; i++) {
    startTime                                  12 bytes
    offsetSize                                 10 bytes
  }
}
SubtitleReel( ) {
  ID                                           36 bytes
  ContentTitleTextLanguage                     2 bytes
  ContentTitleTextSize                         2 bytes
  for(i=0; i<ContentTitleTextSize; i++){
    ContentTitleText                           bytes
  }
  AnnotationTextLanguage                       2 bytes
  AnnotationTextSize                           2 bytes
  for(i=0; i<AnnotationTextSize; i++){
    AnnotationText                             bytes
  }
  IssueDate                                    20 bytes
  ReelNumberExist                              1 byte
  if (ReelNumberExist){
    ReelNumber                                 4 bytes
  }
  Language                                     2 bytes
  StartTimeExist                               1 byte
  if (StartTimeExist){
    StartTime                                  12 bytes
  }
  LoadFontNumber                               2 bytes
  for(i=0; i<LoadFontNumber; i++){
    FontID                                     26 bytes
    fontFileSize                               6 bytes
        for(i=0; i<fontFileSize; i++){
          FontFile                             bytes
        }
  }
}
SubtitleTextList( ) {
  FontElementExist                             1 byte
  if (FontElementExist){
    FontID                                     26 bytes
    Script                                     1 byte
    Effect                                     1 byte
    Italic                                     1 byte
    Underline                                  1 byte
    Weight                                     1 byte
    Color                                      8 bytes
    EffectColor                                8 bytes
    Size                                       3 bytes
  }
  TextInstanceNumber                           4 bytes
  for(i=0; i<TextInstanceNumber; i++){
    FontElementExist                           1 byte
    if (FontElementExist){
      FontID                                   26 bytes
      Script                                   1 byte
      Effect                                   1 byte
      Italic                                   1 byte
      Underline                                1 byte
      Weight                                   1 byte
      Color                                    8 bytes
      EffectColor                              8 bytes
      Size                                     3 bytes
    }
    TimeIn                                     12 bytes
    TimeOut                                    12 bytes
    FadeUpTime                                 12 bytes
    FadeDownTime                               12 bytes
    Halign                                     1 byte
    Hposition                                  2 byte
    Valign                                     1 byte
    Vposition                                  1 byte
    Direction                                  3 bytes
    ColumnNumber                               1 byte
    for(i=0; i<ColumnNumberr; i++){
      textSize                                 2 byte
      for(i=0; i<textSize; i++){
        text                                   bytes
      }
    }
  }
}
SubtitlePictureList( ) {
  PictureNumber                                4 bytes
  for(i=0; i<PictureNumber; i++) {
    TimeIn                                     12 bytes
    TimeOut                                    12 bytes
    FadeUpTime                                 bytes
    FadeDownTime                               12 bytes
    Halign                                     1 byte
    Hposition                                  1 byte
    Valign                                     1 byte
    Vposition                                  1 byte
    PictureSize                                4 bytes
    for(i=0; i<PictureSize; i++) {
      PNG file( )                              5 bytes
    }
  }
}
```

Next, there will be shown semantic content of each code in the aforementioned internal file 40.

index( )
TotalSize:
  File size in bytes, of up to 1 to 9,999,999,999 in decimal notation
TextSize:
  Size of SubtitleTextList( ) in bytes, of up to 1 to 99,999,999 in decimal notation
PictureSize:
  Size of SubtitlePictureList( ) in bytes, of up to 1 to 999,999 in decimal notation
PictureNumber:
  No. of PNG files included in a field defined by <SubtitleReel> tag, of 1 to 9,999 in decimal number
PictureStartTime:
  Value of TimeIn set for each PNG file
PictureOffsetSize:
  Offset from top of each PNG file in bytes, of up to 1 to 9,999,999,999 in decimal notation
SubtitleReel( )
ID
  time-low "-" time-mid "-" time-high-and-version "-"
  clock-seq-and-reserved, clock-seq-low "-" node
  time-low                    = 8hexDigit
  time-mid                    = 4hexDigit
  time-high-and-version       = 4hexDigit
  clock-seq-and-reserved      = 2hexDigit
  clock-seq-low               = 2hexDigit
  node                        = 12hexDigit
  example) f81d4fae-7dec-11d0-a765-00a0c91e6bf6
ContentTitleTextLanguage:
  Language code indicating ContentTitleText by XML xs:language type
ContentTitleTextSize:
  Size in bytes of ContentTitleText, of up to 1 to 99 in decimal notation
ContentTitleText:
  Character information describing title or the like of a content
AnnotationTextLanguage:
  Language code indicating AnnotationText by XML xs:language type
AnnotationTextSize:
  Size in bytes of Annnotation Text, of up to 0 to 99 in decimal notation
AnnotationText:
  Character information describing the content or the like of a content -continued IssueDate:
    Information on date and time on which a file has been generated, represented by XML xs:dateTime type
        Example)    2005-03-20T20:00:00Z
ReelNumberExist:
    Indicates existence or absence of ReelNumber element indicated with <ReelNumber> tag in xml file.    1:exist, 0:not exist
ReelNumber:
    Number for a reel including a file in case the file extends over a plurality of reels, of 1 to 9,999 in decimal notation
Language:
    Language code used in a subtitle file text, indicated with XML xs:language type
StartTimeExist:
    Indicates existence or absence of StartTime element indicated with <StartTime> tag in xml file. 1:exist, 0: not exist
StartTime:
    Specifies time at which subtitle starts being processed
        Example)    01:00:00:000
LoadFontNumber:
    No. of font files to be downloaded, of 0 to 99 in decimal notation
FontID:
    Specifies an ID for a font to be downloaded, for correspondence with a font specified for use with an ID in the Font element in SubtitleTextList. For example, it indicates the name of a font file.
fontFileSize:
    Size in bytes of a font file. Size of a file indicated with <LoadFontID>tag in xml, of 1 to 999,999 in decimal notation
FontFile:
    Substance of font file. A file indicated with <LoadFontID> tag in xml
SubtitleTextList( )
TextInstanceNumber:
    No. of repetitions of FontElement and TextElement or TextEelement, of 0 to 9,999 in decimal notation
FontElementExist:
    Indicates existence or absence of Font element indicated with <Font> tag in xml file.    1:exist, 0:not exist
X: In case no description exists
FontID:
    Specifies an ID for a font to be downloaded, for correspondence with a font specified for use with an ID in the Font element in SubtitleTextList. For example, it indicates the name of a font file. In case no description exists, "0" is set in all places.
Script:
    A part of character modification, specifying whether a font is formed as superscript, subscript or normally.    0: Superscript, 1: Subscript, 2: Normal or no description
Effect:
    A part of character modification, specifying whether a font is to be outlined, shadowed or formed normally.    0: Outline, 1: Shadow, 2: Normal or no description
Italic:
    0: off, 1: on (Italic).    In case no description exists, Italic="0".
Underline:
    0: off, 1: on (Underline).    In case no description exists, Underline="0".
Weight:
    0: off, 1: on (Italic).    In case no description exists, Weight="0".
Color:
    Specifies a color of font, ARGB each with 2hexDigit.    In case no description exists, Color="FFFFFFFF" (opaque white).
EffectColor:
    Specifies a color of font modification, ARGB each with 2hexDigit.    In case no description exists, EffectColor="FF000000" (opaque black).
Size:
    Specifies a font size in points, of 1 to 999 in decimal notation
In case no description exists, Size="42".
TimeIn:
    A time at which display of font or picture is started, indicated with HH:MM:SS:EEE.    EEE: Edit units = 1/250 sec = 4 msec
TimeOut:
    A time at which display of font or picture is ended, indicated with HH:MM:SS:EEE.
FadeUpTime:
    A time taken for shift from 100% transparency to complete opacity, indicated with HH:MM:SS:EEE -continued FadeDownTime:
    A time taken for shift from complete opacity to 100% transparency, indicated with HH:MM:SS:EEE
Halign:
    Specifies a horizontal position of a font or picture with reference to Hposition.    0: Left, 1: Center, 2: Right
Hposition:
    Specifies a reference for the horizontal position of a font or picture with reference to Halign.    When Halign-Left, the left end of a screen is specified as the reference.    When Halign=Right, the screen right end is specified as the reference.    When Halign=Center, the screen center is specified as the reference.
Valign:
    Specifies a vertical position of a font or picture with reference to Vposition.    0: Top, 1: Center, 2: Bottom
Vposition:
    Specifies a reference for the vertical position of a font or picture. When Valign=Top, the upper end of a screen is specified as the reference. When Valign=Bottom, the screen lower end is specified as the reference. When Valign=Center, the screen center is specified as the reference.
Direction;
    Specifies a direction in which fonts are to be depicted.    0: Left to right, 1: Right to left, 2: Top to bottom
ColumnNumber:
    No. of lines to be displayed.    That is, it is a number of occurrences of an area specified by <Text> tag in Subtitle element indicated with <Subtitle> tag in xml file.
textSize:
    No. in bytes of characters to be depicted.    That is, it is a number of bytes of displayed characters specified by an area specified by <Text> tag in Subtitle element indicated with <Subtitle> tag in xml file.
text:
    A displayed character.    That is, it is a character specified by <Text> tag in Subtitle element indicated with <Subtitle> tag in xml file.
PictureNumber:
PictureNumber:
    No. of PNG files included in a field defined by <SubtitleReel> tag
PictureSize:
    Size of PNG file in bytes, of up to 1 to 999,999 in decimal notation
PNGfile( ):
    Substance of PNG file.    A file indicated with <Image> tag in xml file.

It should be understood by those skilled in the art that various modifications, combinations, sub-combinations and alterations may occur depending on design requirements and other factors insofar as they are within the scope of the appended claims or the equivalents thereof.

What is claimed is:

1. A subtitle generating apparatus destined for use in a digital movie screening system, the subtitle generating apparatus comprising:
    a storage unit having a movie subtitle file stored therein;
    a controller to generate an internal file on the basis of the subtitle file; and
    a subtitle processor to decode the internal file for generating a subtitle and combine the subtitle and a movie picture with each other,
    the subtitle file including a main file in which there are described information identifying a file of text data representing characters to be displayed as a subtitle of a movie and a file of image data representing the content of an image displayed as the movie subtitle along with control data for displaying the subtitle, one or more font files including font data on the text data, and one or more image files including the image data;
    the internal file being an integration of the main, font and image files, made by combining the described content of the main file with the substantive data of the font and image files; and the controller generating the internal file from the subtitle file prior to displaying the movie, wherein the storage unit stores the internal file, and the subtitle processor generates the subtitle without reading the subtitle file, wherein when identification information of a font file or an image file is included in the subtitle file, the controller reads the font file or the image file associated with the identification information and loads the data in the font file or the image file associated with the identification information into the internal file for a purpose of the integration.

2. The subtitle generating apparatus according to claim 1, wherein the internal file is divided into a header part including header information on the main file, text data part including the text data and a picture data part including image data and these parts are described together.

3. The subtitle generating apparatus according to claim 2, wherein the internal file includes an index part having described therein a data size of each element in the header, text data and picture data parts and number of repetitions of manipulation of each element.

4. The subtitle generating apparatus according to claim 3, wherein the index part is described at the top of the internal file.

5. The subtitle generating apparatus according to claim 3, wherein the index, header, text data and picture data parts are managed as independent files, respectively.

6. The subtitle generating apparatus according to claim 3, wherein the index part is managed as a file independent of the other files.

7. The subtitle generating apparatus according to claim 3, wherein the picture data part is managed as a file independent of the other files.

8. A subtitle generating apparatus destined for use in a digital movie screening system, the subtitle generating apparatus comprising:

a storage unit having a movie subtitle file stored therein;

a controller to generate an internal file on the basis of the subtitle file; and a subtitle processor to decode the internal file for generating a subtitle and combine the subtitle and a movie picture with each other, the subtitle file including a main file in which there are described information identifying a file of text data representing characters to be displayed as a subtitle of a movie and a file of image data representing the content of an image displayed as the movie subtitle along with control data for displaying the subtitle, one or more font files including font data on the text data, and one or more image files including the image data;

the internal file including an index part in which there are described data size per element of a picture data part and time at which each element is to be displayed;

the controller generating the internal file from the subtitle file prior to displaying the movie, wherein the storage unit stores the internal file, and the subtitle processor generates the subtitle without reading the subtitle file, wherein when identification information of a font file or an image file is included in the subtitle file, the controller reads the font file or the image file associated with the identification information and loads the data in the font file or the image file associated with the identification information into the internal file for a purpose of the integration.

9. The subtitle generating apparatus according to claim 8, further comprising a transfer controller to transfer the internal file from the storage unit to the subtitle processor, the transfer controller reading and analyzing the index part to calculate the capacity of an internal memory in the subtitle processor on the basis of the display time and data size of each element and transferring data in the internal memory to prevent data from overflowing the internal memory.

10. The subtitle generating apparatus according to claim 8, further comprising a transfer controller to transfer the internal file from the storage unit to the subtitle processor, the transfer controller reading and analyzing the index part to calculate the capacity of an internal memory in the subtitle processor on the basis of the display time and data size of each element and issuing a command for transfer of data in the index part and subsequent parts to prevent data from overflowing the internal memory.

11. A method of generating a subtitle in a digital movie screening system, wherein:

there having been stored in a recording medium a subtitle file including a main file in which information identifying a file of text data representing characters to be displayed as a subtitle of a movie and a file of image data representing the content of an image to be displayed as the movie subtitle is described along with control data for displaying a subtitle, one or more font files including font data on the text data, and one or more picture files including the image data, and there having been generated an internal file that is an integration of the main, font and image files prior to screening the movie by combining the described content of the main file with the substantive data of the font and image files on the basis of the subtitle file, the subtitle is generated by decoding the internal file while a movie picture is screened; and combined with the movie picture, wherein the recording medium stores the internal file, and after the internal file is generated, the subtitle is generated without reading the subtitle file, wherein when identification information of a font file or an image file is included in the subtitle file, the font file or the image file associated with the identification information is read and the data in the font file or the image file associated with the identification information is loaded into the internal file for a purpose of the integration.

12. The subtitle generating method according to claim 11, wherein the internal file is divided into a header part including header information on the main file, text data part including the text data and a picture data part including image data and these parts are described together.

13. The subtitle generating method according to claim 11, wherein the internal file includes an index part having described therein a data size of each element in at least the picture data part and number of repetitions of manipulation of each element.

14. The subtitle generating method according to claim 11, wherein the index part is described at the top of the internal file.

15. The subtitle generating method according to claim 11, wherein the index, header, text data and picture data parts are managed as independent files, respectively.

16. The subtitle generating method according to claim 11, wherein the index part is managed as a file independent of the other files.

17. The subtitle generating method according to claim 11, wherein the picture data part is managed as a file independent of the other files.

18. A method of generating a subtitle in a digital movie screening system, wherein:
   there having been stored in a recording medium a subtitle file including a main file in which information identifying a file of text data representing characters to be displayed as a subtitle of a movie and a file of image data representing the content of an image to be displayed as the movie subtitle is described along with control data for displaying a subtitle, one or more font files including font data on the text data, and one or more picture files including the image data,
   an internal file including an index part in which there are described data size per element of a picture data part and time at which each element is to be displayed is generated from the subtitle file prior to screening the movie,
   wherein the recording medium stores the internal file, and after the internal file is generated, the subtitle is generated without reading the subtitle file,
   wherein when identification information of a font file or an image file is included in the subtitle file, the font file or the image file associated with the identification information is read and the data in the font file or the image file associated with the identification information is loaded into the internal file for a purpose of the integration.

19. The subtitle generating method according to claim 18, wherein the capacity of the internal memory is calculated based on the display time and data size of each element and controlled to prevent data from overflowing the internal memory when transferring data in the internal file.

20. The subtitle generating method according to claim 19, wherein the data transfer to the internal memory is controlled by a processor that processes the subtitle.

* * * * *